US012795569B2

(12) United States Patent
Luo et al.

(10) Patent No.: US 12,795,569 B2
(45) Date of Patent: Nov. 10, 2026

(54) COMMUNICATION METHOD AND APPARATUS

(71) Applicant: HUAWEI TECHNOLOGIES CO., LTD., Shenzhen (CN)

(72) Inventors: Zhihu Luo, Beijing (CN); Zhe Jin, Beijing (CN); Hailong Hou, Beijing (CN); Weilin Qu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 367 days.

(21) Appl. No.: 18/409,749

(22) Filed: Jan. 10, 2024

(65) Prior Publication Data

US 2024/0163818 A1 May 16, 2024

Related U.S. Application Data

(63) Continuation of application No. PCT/CN2022/108970, filed on Jul. 29, 2022.

(30) Foreign Application Priority Data

Jul. 30, 2021 (CN) ......................... 202110872440.6
Oct. 27, 2021 (CN) ......................... 202111254100.3

(51) Int. Cl.
*H04W 56/00* (2009.01)

(52) U.S. Cl.
CPC ... *H04W 56/0015* (2013.01); *H04W 56/0035* (2013.01)

(58) Field of Classification Search
None
See application file for complete search history.

(56) References Cited

U.S. PATENT DOCUMENTS 10,939,396 B2 * 3/2021 Oh ...................... H04W 56/001
2023/0388167 A1 * 11/2023 Cheema ................ H04L 27/261

FOREIGN PATENT DOCUMENTS

CN 111464274 A 7/2020
CN 111836380 A 10/2020
CN 109120390 B 1/2021
EP 4145916 A1 * 3/2023 ......... H04L 27/2692

(Continued)

OTHER PUBLICATIONS

3GPP TS 38.104 V15.9.0 (Mar. 2020), 3rd Generation Partnership Project; Technical Specification Group Radio Access Network; NR; Base Station (BS) radio transmission and reception (Release 15), total 233 pages.

(Continued)

*Primary Examiner* — Eunsook Choi

(57) ABSTRACT

This application provides a communication method and apparatus, to resolve a problem of receiving and sending an SSB in a bandwidth-limited network such as a dedicated network. The method includes: generating a sequence corresponding to a first synchronization signal/physical broadcast channel block (SSB), and determining a first SSB frequency location; and sending, based on the determined first SSB frequency location, the sequence corresponding to the first SSB. The first SSB frequency location is associated with bandwidth of a network in which the first SSB is located, or the first SSB frequency location is related to at least one of a lowest frequency of a network or a highest frequency of the network.

15 Claims, 18 Drawing Sheets

(56) References Cited

FOREIGN PATENT DOCUMENTS

| | | | | | |
|---|---|---|---|---|---|
| EP | 4344315 | A2 * | 3/2024 | ............ | H04W 72/53 |
| WO | 2020118717 | A1 | 6/2020 | | |
| WO | WO-2021229258 | A1 * | 11/2021 | ........... | H04L 5/0053 |

OTHER PUBLICATIONS

3GPP TS 38.211 V15.5.0 (Mar. 2019), 3rd Generation Partnership Project; Technical Specification Group Radio Access Network; NR; Physical channels and modulation(Release 15), total 96 pages.

* cited by examiner

COMMUNICATION METHOD AND APPARATUS

CROSS-REFERENCE TO RELATED APPLICATIONS

This application is a continuation of International Application No. PCT/CN2022/108970, filed on Jul. 29, 2022, which claims priority to Chinese Patent Application No. 202110872440.6, filed on Jul. 30, 2021 and Chinese Patent Application No. 202111254100.3, filed on Oct. 27, 2021. All of the aforementioned patent applications are hereby incorporated by reference in their entireties.

TECHNICAL FIELD

This application relates to the field of communication technologies, and in particular, to a communication method and apparatus.

BACKGROUND

After being powered on, a terminal device obtains downlink time and frequency synchronization by receiving a synchronization signal/physical broadcast channel block (SS/PBCH block, SSB). In a new radio (new radio, NR) system, after being powered on, the terminal device blindly detects, based on a preset step, possible frequency locations of all SSBs in a frequency band supported by the terminal device.

Currently, a bandwidth-limited network system such as a dedicated network is introduced. Bandwidth of the bandwidth-limited network system is small. Therefore, a manner of sending an SSB in the NR system may cause a series of problems. For example, because the bandwidth is small, the SSB cannot be completely sent. Therefore, how to receive and send the SSB in the bandwidth-limited network system such as the dedicated network is an urgent problem to be resolved.

SUMMARY

This application provides a communication method and apparatus, to resolve a problem of how to receive and send an SSB in a bandwidth-limited network system such as a dedicated network.

According to a first aspect, this application provides a communication method. The method is applicable to a network device that performs communication in a first network. The method may be performed by the network device, a chip, or a circuit. The method includes: generating a sequence corresponding to a first SSB; determining a first SSB frequency location; and sending, based on the determined first SSB frequency location, the sequence corresponding to the first SSB. The first SSB frequency location is associated with bandwidth of the first network, or the first SSB frequency location is related to a lowest frequency of the first network and/or a highest frequency of the first network.

In this embodiment of this application, an SSB frequency location is associated with bandwidth of a network, so that the network device can determine a frequency domain position of an SSB based on a corresponding bandwidth value, and a terminal device can detect the SSB at a possible SSB frequency location corresponding to the bandwidth. In the foregoing manner, a quantity of attempts made by the terminal device to receive the SSB can be reduced, and therefore power consumption of the terminal device is reduced.

The SSB frequency location is determined based on a lowest frequency of a network and/or a highest frequency of the network, so that the terminal device can directly determine a frequency location for receiving the SSB. Compared with a manner in which the terminal device makes a plurality of attempts to receive an SSB, this can reduce the power consumption of the terminal device, improve energy saving effect, and reduce complexity of the terminal device.

In addition, the SSB frequency location is aligned with a center frequency of the network, so that it can be ensured, to some extent, that a synchronization signal of the SSB is completely mapped into a frequency range of the network, and the terminal device can perform time and frequency synchronization based on the synchronization signal. A lowest frequency of the SSB is aligned with the lowest frequency of the network, and a highest frequency of the SSB is aligned with the highest frequency of the network, so that a synchronization raster can be consistent with a channel raster. This can avoid, to some extent, a waste of resources caused by inconsistency between the synchronization raster and the channel raster, and improve resource utilization.

In a possible design, the first SSB frequency location $SS_{REF}$ may meet:

$$SS_{REF}=N\times f_1+M\times f_2$$

$f_1$ and $f_2$ are constants greater than 0. N is a coefficient of $f_1$, and N is a positive integer. A value of M is associated with the bandwidth of the first network.

In this embodiment of this application, the value of M is associated with the bandwidth of the first network, so that the network device can determine a frequency domain position of the first SSB based on the corresponding value of M, and the terminal device can detect the first SSB at a possible SSB frequency location corresponding to the value of M. In the foregoing manner, a quantity of attempts made by the terminal device to receive the first SSB can be reduced, and therefore the power consumption of the terminal device is reduced. For example, if a value of M corresponding to the bandwidth of the first network is 1, the terminal device attempts to receive the first SSB at an SSB frequency location $SS_{REF}$=N×1200 kHz+1×50 kHz corresponding to M=1. If N has 2500 values, the terminal device needs to make 2500 attempts in a worst case. However, if the foregoing manner is not used, the terminal device attempts to receive the first SSB at SSB frequency locations $SS_{REF}$=N×1200 kHz+1×50 kHz corresponding to all values of M. If N has 2500 values, and M has three values, the terminal device needs to make 2500×3 attempts in a worst case. It can be learned that, in the foregoing manner, a quantity of attempts made by the terminal device to receive the SSB can be greatly reduced.

In a possible design, the first SSB frequency location $SS_{REF}$ meets: $SS_{REF}=(F_{DL\_low}+F_{DL\_high})/2$. In the foregoing manner, the first SSB frequency location is aligned with a center frequency of the first network, so that it can be ensured, to some extent, that a synchronization signal of the first SSB is completely mapped into a frequency range of the first network.

In a possible design, the first SSB frequency location $SS_{REF}$ meets: $SS_{REF}=F_{DL\_low}+\Delta 1$. $\Delta 1$ is an offset value. $F_{DL\_low}$ is a lowest frequency. In the foregoing manner, the lowest frequency of the first SSB is aligned with the lowest frequency of the first network, so that the synchronization raster can be consistent with the channel raster. This can avoid, to some extent, the waste of resources caused by inconsistency between the synchronization raster and the channel raster, and improve the resource utilization.

In a possible design, the first SSB frequency location $SS_{REF}$ meets: $SS_{REF}=F_{DL\_high}-\Delta 2$. $\Delta 2$ is an offset value. $F_{DL\_high}$ is a highest frequency. In the foregoing manner, the highest frequency of the first SSB is aligned with the highest frequency of the first network, so that the synchronization raster is consistent with the channel raster. This can avoid, to some extent, the waste of resources caused by inconsistency between the synchronization raster and the channel raster, and improve the resource utilization.

In a possible design, $\Delta 1$ is ½ of bandwidth corresponding to the SSB.

In a possible design, $\Delta 2$ is ½ of bandwidth corresponding to the SSB.

In a possible design, the first SSB frequency location may correspond to a central location of a subcarrier k in the first SSB, where $$k = \frac{1}{2}K,$$

and K is a total quantity of subcarriers in the first SSB.

In a possible design, the first SSB frequency location meets: The synchronization signal in the first SSB may be completely mapped into the frequency range of the first network based on the first SSB frequency location.

In the foregoing manner, it can be ensured, to some extent, that the synchronization signal of the first SSB is completely sent, and therefore the terminal device can perform time and frequency synchronization based on the synchronization signal.

In a possible design, the method further includes: determining the bandwidth of the first network based on a frequency band number of the first network, where an association relationship exists between the bandwidth of the first network and the frequency band number of the first network. In the foregoing manner, the frequency band number of the first network is associated with the bandwidth. This can avoid blind detection of the frequency range of the first network, and improve the resource utilization.

In a possible design, the method further includes: determining the bandwidth of the first network based on a frequency band number of the first network, where an association relationship exists between the bandwidth of the first network and the frequency band number of the first network; and determining the lowest frequency and/or the highest frequency based on the frequency band number and the bandwidth. In the foregoing manner, the frequency band number of the first network is associated with the bandwidth. This can avoid blind detection of the frequency range of the first network, and improve the resource utilization.

In a possible design, the method further includes: determining the lowest frequency and/or the highest frequency of the first network based on a frequency band number of the first network, where an association relationship exists between the frequency range of the first network and the frequency band number of the first network. In the foregoing manner, blind detection of the frequency range of the first network can be avoided, and the resource utilization is improved.

According to a second aspect, this application provides a communication method. The method is applicable to a terminal device that performs communication in a first network. The method may be performed by the terminal device, a chip, or a circuit. The method includes: detecting a sequence of a first SSB at a first SSB frequency location, and obtaining time and frequency synchronization based on the sequence of the first SSB. The first SSB frequency location is associated with bandwidth of the first network, or the first SSB frequency location is related to a lowest frequency of the first network and/or a highest frequency of the first network.

In this embodiment of this application, an SSB frequency location is associated with bandwidth of a network, so that the network device can determine a frequency domain position of an SSB based on a corresponding bandwidth value, and the terminal device can detect the SSB at a possible SSB frequency location corresponding to the bandwidth. In the foregoing manner, a quantity of attempts made by the terminal device to receive the SSB can be reduced, and therefore power consumption of the terminal device is reduced.

The SSB frequency location is determined based on a lowest frequency of a network and/or a highest frequency of the network, so that the terminal device can directly determine a frequency location for receiving the SSB. Compared with a manner in which the terminal device makes a plurality of attempts to receive an SSB, this can reduce the power consumption of the terminal device, improve energy saving effect, and reduce complexity of the terminal device.

In addition, the SSB frequency location is aligned with a center frequency of the network, so that it can be ensured, to some extent, that a synchronization signal of the SSB is completely mapped into a frequency range of the network, and the terminal device can perform time and frequency synchronization based on the synchronization signal. A lowest frequency of the SSB is aligned with the lowest frequency of the network, and a highest frequency of the SSB is aligned with the highest frequency of the network, so that a synchronization raster can be consistent with a channel raster. This can avoid, to some extent, a waste of resources caused by inconsistency between the synchronization raster and the channel raster, and improve resource utilization.

In a possible design, the method further includes: determining the bandwidth of the first network based on a frequency band number of the first network, where an association relationship exists between the bandwidth of the first network and the frequency band number of the first network. In the foregoing manner, the frequency band number of the first network is associated with the bandwidth, so that the terminal device does not blindly detect a frequency range of the first network. This reduces the power consumption of the terminal device, improves the energy saving effect, and can reduce the complexity of the terminal device.

In a possible design, the method further includes: determining the bandwidth of the first network based on a frequency band number of the first network, where an association relationship exists between the bandwidth of the first network and the frequency band number of the first network; and determining the lowest frequency and/or the highest frequency based on the frequency band number and the bandwidth. In the foregoing manner, the frequency band number of the first network is associated with the bandwidth, so that the terminal device does not blindly detect the frequency range of the first network. This reduces the power consumption of the terminal device, improves the energy saving effect, and can reduce the complexity of the terminal device.

In a possible design, each of P SSB frequency locations for detecting the first SSB meets: A synchronization signal in the first SSB may be completely mapped into the frequency range of the first network based on the SSB frequency location. P is a positive integer. The P SSB frequency locations include the first SSB frequency location. In the foregoing manner, the power consumption of the terminal device can be reduced, and the energy saving effect can be improved.

In a possible design, the method further includes: determining the lowest frequency and/or the highest frequency of the first network based on a frequency band number of the first network, where an association relationship exists between the frequency range of the first network and the frequency band number of the first network. According to the foregoing design, the terminal device does not blindly detect the frequency range of the first network. This reduces the power consumption of the terminal device, improves the energy saving effect, and can reduce the complexity of the terminal device.

In a possible design, the first SSB frequency location $SS_{REF}$ may meet:

$$SS_{REF} = N \times f_1 + M \times f_2$$

$f_1$ and $f_2$ are constants greater than 0. N is a coefficient of $f_1$, and N is a positive integer. A value of M is associated with the bandwidth of the first network.

In this embodiment of this application, the value of M is associated with the bandwidth of the first network, so that the network device can determine a frequency domain position of the first SSB based on the corresponding value of M, and the terminal device can detect the first SSB at a possible SSB frequency location corresponding to the value of M. In the foregoing manner, a quantity of attempts made by the terminal device to receive the first SSB can be reduced, and therefore the power consumption of the terminal device is reduced. For example, if a value of M corresponding to the bandwidth of the first network is 1, the terminal device attempts to receive the first SSB at an SSB frequency location $SS_{REF}$=N×1200 kHz+1×50 kHz corresponding to M=1. If N has 2500 values, the terminal device needs to make 2500 attempts in a worst case. However, if the foregoing manner is not used, the terminal device attempts to receive the first SSB at SSB frequency locations $SS_{REF}$=N×1200 kHz+1×50 kHz corresponding to all values of M. If N has 2500 values, and M has three values, the terminal device needs to make 2500×3 attempts in a worst case. It can be learned that, in the foregoing manner, the quantity of attempts made by the terminal device to receive the SSB can be greatly reduced.

In a possible design, the first SSB frequency location $SS_{REF}$ meets: $SS_{REF}=(F_{DL\_low}+F_{DL\_high})/2$. In the foregoing manner, the first SSB frequency location is aligned with a center frequency of the first network, so that it can be ensured, to some extent, that the synchronization signal of the first SSB is completely mapped into the frequency range of the first network.

In a possible design, the first SSB frequency location $SS_{REF}$ meets: $SS_{REF}=F_{DL\_low}+\Delta 1$. Δ1 is an offset value. $F_{DL\_low}$ is a lowest frequency. In the foregoing manner, the lowest frequency of the first SSB is aligned with the lowest frequency of the first network, so that the synchronization raster can be consistent with the channel raster. This can avoid, to some extent, the waste of resources caused by inconsistency between the synchronization raster and the channel raster, and improve the resource utilization.

In a possible design, the first SSB frequency location $SS_{REF}$ meets: $SS_{REF}=F_{DL\_high}-\Delta 2$. Δ2 is an offset value. $F_{DL\_high}$ is a highest frequency. In the foregoing manner, the highest frequency of the first SSB is aligned with the highest frequency of the first network, so that the synchronization raster is consistent with the channel raster. This can avoid, to some extent, the waste of resources caused by inconsistency between the synchronization raster and the channel raster, and improve the resource utilization.

In a possible design, Δ1 is ½ of bandwidth corresponding to the SSB.

In a possible design, Δ2 is ½ of bandwidth corresponding to the SSB.

In a possible design, the first SSB frequency location may correspond to a central location of a subcarrier k in the first SSB, where $$k = \frac{1}{2}K,$$

and K is a total quantity of subcarriers in the first SSB.

In a possible design, the first SSB frequency location meets: The synchronization signal in the first SSB may be completely mapped into the frequency range of the first network based on the first SSB frequency location.

In the foregoing manner, it can be ensured, to some extent, that the synchronization signal of the first SSB is completely sent, and therefore the terminal device can perform time and frequency synchronization based on the synchronization signal.

According to a third aspect, this application provides a communication method. The method may be performed by a network device, a chip, or a circuit. The method includes: generating a sequence corresponding to a first SSB; determining, based on a first SSB frequency location and a frequency range of a corresponding first network, a mapping manner of the sequence corresponding to the first SSB; mapping, based on the determined mapping manner, the sequence corresponding to the first SSB; and sending the mapped sequence corresponding to the first SSB.

In this embodiment of this application, the mapping manner of the sequence corresponding to the first SSB may be determined based on the first SSB frequency location and the frequency range of the first network. Compared with mapping an SSB in a fixed format in NR, the mapping manner of the SSB in this embodiment of this application is more flexible. Therefore, the mapping manner of the SSB may be adjusted based on a specific scenario, to more accurately send the SSB. For example, in a scenario in which an SSB cannot be completely mapped into a frequency range of a network, the SSB may be completely sent by adjusting a mapping manner of the SSB.

In a possible design, the mapping manner may be: mapping a first sequence in the sequence corresponding to the first SSB to a first resource in a frequency range, and mapping a second sequence in the sequence corresponding to the first SSB to a second resource in the frequency range. The first resource and the second resource do not overlap. A maximum index of a subcarrier in the first resource is less than a minimum index of a subcarrier in the second resource.

A minimum index of a sequence mapped to a first OFDM symbol of the first resource is greater than a maximum index of a sequence mapped to a first OFDM symbol of the second resource.

According to the foregoing design, a part of the sequence that is in the first SSB and that cannot be mapped into the frequency range of the first network based on the first SSB frequency location may be mapped into the frequency range of the first network, to ensure that the first SSB is completely sent in the first network. This improves spectrum resource utilization of a bandwidth-limited network system such as a dedicated network.

In a possible design, a location of the first resource is determined based on the first SSB frequency location.

In a possible design, the first sequence and the second sequence are determined based on the first SSB frequency location and the frequency range of the first network.

In a possible design, the method further includes: determining bandwidth of the first network based on a frequency band number of the first network, where an association relationship exists between the bandwidth of the first network and the frequency band number of the first network; and determining a lowest frequency and/or a highest frequency based on the frequency band number and the bandwidth. In the foregoing manner, the frequency band number of the first network is associated with the bandwidth, so that the terminal device does not blindly detect the frequency range of the first network. This reduces power consumption of the terminal device, improves energy saving effect, and can reduce complexity of the terminal device.

In a possible design, when the mapping manner of the sequence corresponding to the first SSB is determined based on the first SSB frequency location and the frequency range of the corresponding first network, specifically, if it is determined, based on the first SSB frequency location, bandwidth of the first SSB, and the frequency range of the first network, that a part of the sequence of the first SSB is mapped outside the frequency range of the first network, it may be determined that the mapping manner is: The first sequence is mapped to the first resource in the frequency range of the first network, and the second sequence is mapped to the second resource in the frequency range of the first network. The first sequence meets: The first sequence may be mapped into the frequency range of the first network based on the first SSB frequency location. The second sequence meets: The second sequence is mapped outside the frequency range of the first network based on the first SSB frequency location.

According to the foregoing design, the part of the sequence that is in the first SSB and that cannot be mapped into the frequency range of the first network based on the first SSB frequency location may be mapped into the frequency range of the first network, to ensure that the first SSB is completely sent in the first network. This improves the spectrum resource utilization of the bandwidth-limited network system such as the dedicated network.

According to a fourth aspect, this application provides a communication method. The method may be performed by a terminal device, a chip, or a circuit. The method includes: determining, based on a first SSB frequency location and a frequency range of a corresponding first network, a mapping manner of a sequence corresponding to the first SSB; and receiving the sequence of the first SSB based on the determined mapping manner.

In this embodiment of this application, the mapping manner of the sequence corresponding to the first SSB may be determined based on the first SSB frequency location and the frequency range of the first network. Compared with mapping an SSB in a fixed format in NR, the mapping manner of the SSB in this embodiment of this application is more flexible. Therefore, the mapping manner of the SSB may be adjusted based on a specific scenario, to more accurately send the SSB. For example, in a scenario in which an SSB cannot be completely mapped into a frequency range of a network, the SSB may be completely sent by adjusting a mapping manner of the SSB.

In a possible design, the method further includes: determining bandwidth of the first network based on a frequency band number of the first network, where an association relationship exists between the bandwidth of the first network and the frequency band number of the first network; and determining a lowest frequency and/or a highest frequency based on the frequency band number and the bandwidth. In the foregoing manner, the frequency band number of the first network is associated with the bandwidth, so that the terminal device does not blindly detect the frequency range of the first network. This reduces power consumption of the terminal device, improves energy saving effect, and can reduce complexity of the terminal device.

In a possible design, when the mapping manner of the sequence corresponding to the first SSB is determined based on the first SSB frequency location and the frequency range of the corresponding first network, specifically, if it is determined, based on the first SSB frequency location, bandwidth of the first SSB, and the frequency range of the first network, that a part of the sequence of the first SSB is mapped outside the frequency range of the first network, it may be determined that the mapping manner is: A first sequence is mapped to a first resource in the frequency range of the first network, and a second sequence is mapped to a second resource in the frequency range of the first network. The first sequence meets: The first sequence may be mapped into the frequency range of the first network based on the first SSB frequency location. The second sequence meets: The second sequence is mapped outside the frequency range of the first network based on the first SSB frequency location.

According to the foregoing design, the part of the sequence that is in the first SSB and that cannot be mapped into the frequency range of the first network based on the first SSB frequency location may be mapped into the frequency range of the first network, to ensure that the first SSB is completely sent in the first network. This improves spectrum resource utilization of a bandwidth-limited network system such as a dedicated network.

In a possible design, the mapping manner may be: mapping a first sequence in the sequence corresponding to the first SSB to a first resource in a frequency range, and mapping a second sequence in the sequence corresponding to the first SSB to a second resource in the frequency range. The first resource and the second resource do not overlap. A maximum index of a subcarrier in the first resource is less than a minimum index of a subcarrier in the second resource.

A minimum index of a sequence mapped to a first OFDM symbol of the first resource is greater than a maximum index of a sequence mapped to a first OFDM symbol of the second resource.

According to the foregoing design, the part of the sequence that is in the first SSB and that cannot be mapped into the frequency range of the first network based on the first SSB frequency location may be mapped into the frequency range of the first network, to ensure that the first SSB is completely sent in the first network. This improves the spectrum resource utilization of the bandwidth-limited network system such as the dedicated network.

In a possible design, a location of the first resource is determined based on the first SSB frequency location.

In a possible design, the first sequence and the second sequence are determined based on the first SSB frequency location and the frequency range of the first network.

According to a fifth aspect, this application provides a communication method. The method may be performed by a network device, a chip, or a circuit. The method includes: generating a sequence corresponding to a first SSB; determining a first SSB frequency location; and sending the sequence corresponding to the first SSB based on the determined first SSB frequency location. The first SSB frequency location $SS_{REF}$ meets:

$$SS_{REF} = N \times f_1 + M \times f_2$$

$f_1$ and $f_2$ are constants greater than 0. N is a coefficient of $f_1$, and N is a positive integer. A candidate value of M includes at least one integer greater than 5.

In this embodiment of this application, a value of M may be increased, to increase a quantity of SSB frequency locations. This can increase a possibility of completely sending the first SSB in a first network, and improve spectrum resource utilization. In addition, according to the foregoing method, a possibility that the first SSB is aligned with the first network (for example, an SSB frequency location for sending the first SSB is aligned with a center frequency of the first network, a lowest frequency of the first SSB is aligned with a lowest frequency of the first network, or a highest frequency of the first SSB is aligned with a highest frequency of the first network) can be increased. This can avoid, to some extent, a waste of resources caused by inconsistency between a synchronization raster and a channel raster, and improve resource utilization.

In a possible design, a quantity of candidate values of M is greater than 3.

According to a sixth aspect, this application provides a communication method. The method may be performed by a terminal device, a chip, or a circuit. The method includes: detecting a sequence of a first SSB at a first SSB frequency location, and obtaining time and frequency synchronization based on the sequence of the first SSB. The first SSB frequency location $SS_{REF}$ meets:

$$SS_{REF} = N \times f_1 + M \times f_2$$

$f_1$ and $f_2$ are constants greater than 0. N is a coefficient of $f_1$, and N is a positive integer. A candidate value of M includes at least one integer greater than 5.

In a possible design, a quantity of candidate values of M is greater than 3.

According to a seventh aspect, this application provides a communication method. The method may be performed by a network device, a chip, or a circuit. The method includes: determining a first mapping manner of a PBCH in a first SSB, mapping the first SSB to a resource of a first network based on the determined first mapping manner, and then sending the first SSB. The first mapping manner is one of Q preset mapping manners. Q is an integer greater than 1.

In this embodiment of this application, an existing synchronization signal or a new signal (for example, a first signal) is introduced to indicate a mapping pattern of the PBCH. This can improve deployment flexibility, and prevent a terminal device from performing blind detection, to reduce complexity of the terminal device receiving the PBCH. According to the foregoing method, when the terminal device does not obtain network information (such as bandwidth, a frequency range, a lowest frequency, and/or a highest frequency) of the first network, the terminal device may not need to blindly detect the first network. This can reduce power consumption of the terminal device, and improve energy saving effect.

In a possible design, the method further includes: sending first information to the terminal device. The first information indicates the first mapping manner. According to the foregoing design, power consumption of the terminal device performing blind detection can be reduced, and complexity can be reduced.

In a possible design, the first information may be sent to the terminal device when the first mapping manner meets a preset condition. According to the foregoing design, resource utilization can be improved.

In a possible design, the first information is carried in a synchronization signal of the first SSB. According to the foregoing design, an indication resource can be saved, and the resource utilization can be improved.

In a possible design, the first information is indicated by using a synchronization sequence corresponding to the synchronization signal. The synchronization sequence further indicates a cell identity corresponding to the first information. The synchronization sequence includes a primary synchronization sequence and a secondary synchronization sequence.

In a possible design, the first information is carried in the first signal. According to the foregoing design, indication flexibility can be improved.

In a possible design, the first information is indicated by using a first sequence corresponding to the first signal. The first sequence belongs to a first set. The first set includes at least one primary synchronization sequence and/or at least one secondary synchronization sequence. According to the foregoing design, the synchronization sequence can be reused, to reduce the complexity.

In a possible design, a manner of generating the first sequence is the same as a manner of generating the primary synchronization sequence, and a cyclic shift value for generating the first sequence is different from a cyclic shift value for generating the primary synchronization sequence. According to the foregoing design, the first signal may indicate different mapping manners by using different cyclic shift values.

In a possible design, the first information is indicated by using the cyclic shift value corresponding to the first sequence.

In a possible design, the first information is indicated by using a first bit set corresponding to the first signal. The first bit set includes at least one bit. According to the foregoing design, the first signal may indicate different mapping manners by using different bit sets.

In a possible design, the first signal and the synchronization signal in the first SSB occupy a same resource in frequency domain, and are located in a same slot in time domain.

In a possible design, a quasi-colocation (QCL) relationship between the first signal and the synchronization signal is Type A, Type C, Type A+Type D, or Type C+Type D.

In a possible design, the Q preset mapping manners include at least two of the following mapping manners:

mapping the PBCH based on the bandwidth of the first network;

mapping the PBCH based on bandwidth of an SSB;

mapping the PBCH based on bandwidth of an SSB, and sending, in ascending order in frequency domain, a sequence mapped to a frequency domain unit after an $X^{th}$ frequency domain unit, where X is a positive integer;

mapping the PBCH based on bandwidth of an SSB, and sending, in ascending order in frequency domain, a sequence mapped to a frequency domain unit before a $Y^{th}$ frequency domain unit, where Y is a positive integer; and mapping the PBCH based on bandwidth of an SSB, and sending, in ascending order in frequency domain, a sequence mapped to a frequency domain unit after an $X1^{th}$ frequency domain unit and before a $Y1^{th}$ frequency domain unit, where both X1 and Y1 are positive integers.

According to an eighth aspect, this application provides a communication method. The method may be performed by a terminal device, a chip, or a circuit. The method includes: determining a first mapping manner of a PBCH in a first SSB, and receiving the first SSB based on the determined first mapping manner. The first mapping manner is one of Q preset mapping manners. Q is an integer greater than 1.

In this embodiment of this application, an existing synchronization signal or a new signal (for example, a first signal) is introduced to indicate a mapping pattern of the PBCH. This can improve deployment flexibility, and prevent the terminal device from performing blind detection, to reduce complexity of the terminal device receiving the PBCH. According to the foregoing method, when the terminal device does not obtain network information (such as bandwidth, a frequency range, a lowest frequency, and/or a highest frequency) of a first network, the terminal device may not need to blindly detect the first network. This can reduce power consumption of the terminal device, and improve energy saving effect.

In a possible design, when the first mapping manner of the PBCH in the first SSB is determined, first information may be received. The first information indicates the first mapping manner. According to the foregoing design, power consumption of the terminal device performing blind detection can be reduced, and complexity can be reduced.

In a possible design, the first information is carried in a synchronization signal of the first SSB. According to the foregoing design, an indication resource can be saved, and resource utilization can be improved.

In a possible design, the first information is indicated by using a synchronization sequence corresponding to the synchronization signal. The synchronization sequence further indicates a cell identity corresponding to the first information. The synchronization sequence includes a primary synchronization sequence and a secondary synchronization sequence.

In a possible design, the first information is carried in the first signal. According to the foregoing design, indication flexibility can be improved.

In a possible design, the first information is indicated by using a first sequence corresponding to the first signal. The first sequence belongs to a first set. The first set includes at least one primary synchronization sequence and/or at least one secondary synchronization sequence. According to the foregoing design, the synchronization sequence can be reused, to reduce the complexity.

In a possible design, a manner of generating the first sequence is the same as a manner of generating the primary synchronization sequence, and a cyclic shift value for generating the first sequence is different from a cyclic shift value for generating the primary synchronization sequence. According to the foregoing design, the first signal may indicate different mapping manners by using different cyclic shift values.

In a possible design, the first information is indicated by using the cyclic shift value corresponding to the first sequence.

In a possible design, the first information is indicated by using a first bit set corresponding to the first signal. The first bit set includes at least one bit. According to the foregoing design, the first signal may indicate different mapping manners by using different bit sets.

In a possible design, the first signal and the synchronization signal in the first SSB occupy a same resource in frequency domain, and are located in a same slot in time domain.

In a possible design, a quasi-colocation (QCL) relationship between the first signal and the synchronization signal is Type A, Type C, Type A+Type D, or Type C+Type D.

In a possible design, the Q preset mapping manners include at least two of the following mapping manners:

mapping the PBCH based on the bandwidth of the first network;

mapping the PBCH based on bandwidth of an SSB;

mapping the PBCH based on bandwidth of an SSB, and sending, in ascending order in frequency domain, a sequence mapped to a frequency domain unit after an $X^{th}$ frequency domain unit, where X is a positive integer;

mapping the PBCH based on bandwidth of an SSB, and sending, in ascending order in frequency domain, a sequence mapped to a frequency domain unit before a $Y^{th}$ frequency domain unit, where Y is a positive integer; and mapping the PBCH based on bandwidth of an SSB, and sending, in ascending order in frequency domain, a sequence mapped to a frequency domain unit after an $X1^{th}$ frequency domain unit and before a $Y1^{th}$ frequency domain unit, where both X1 and Y1 are positive integers.

According to a ninth aspect, this application further provides a communication apparatus. The apparatus is a network device that performs communication in a first network or a chip in the network device. The communication apparatus has a function of implementing any method provided in the first aspect, the third aspect, the fifth aspect, or the seventh aspect. The communication apparatus may be implemented by hardware, or may be implemented by hardware executing corresponding software. The hardware or the software includes one or more units or modules corresponding to the function.

In a possible design, the communication apparatus includes a processor. The processor is configured to support the communication apparatus in performing a corresponding function of the network device in the foregoing method. The communication apparatus may further include a memory. The memory may be coupled to the processor. The memory stores program instructions and data that are necessary for the communication apparatus. Optionally, the communication apparatus further includes an interface circuit. The interface circuit is configured to support communication between the communication apparatus and a device such as a terminal device.

For example, the communication apparatus has a function of implementing the method provided in the first aspect. The processor may be configured to: generate a sequence corresponding to a first SSB; determine a first SSB frequency location; and send, by using the interface circuit based on the determined first SSB frequency location, the sequence corresponding to the first SSB. The first SSB frequency location is associated with bandwidth of the first network, or the first SSB frequency location is related to a lowest frequency of the first network and/or a highest frequency of the first network.

For another example, the communication apparatus has a function of implementing the method provided in the third aspect. The processor may be configured to: generate a sequence corresponding to a first SSB; determine, based on a first SSB frequency location and a frequency range of the first network, a mapping manner of the sequence corresponding to the first SSB; map, based on the determined mapping manner, the sequence corresponding to the first SSB; and send the mapped sequence corresponding to the first SSB.

For another example, the communication apparatus has a function of implementing the method provided in the fifth aspect. The processor may be configured to: generate a sequence corresponding to a first SSB; determine a first SSB frequency location; and send the sequence corresponding to the first SSB based on the determined first SSB frequency location. The first SSB frequency location $SS_{REF}$ meets:

$$SS_{REF} = N \times f_1 + M \times f_2$$

$f_1$ and $f_2$ are constants greater than 0. N is a coefficient of $f_1$, and N is a positive integer. A candidate value of M includes at least one integer greater than 5.

For another example, the communication apparatus has a function of implementing the method provided in the seventh aspect. The processor may be configured to: determine a first mapping manner of a PBCH in a first SSB; map the PBCH to a resource of the first network based on the determined first mapping manner; and send the mapped PBCH by using the interface circuit. The first mapping manner is one of Q preset mapping manners. Q is an integer greater than 1.

In a possible design, the communication apparatus includes corresponding functional modules that are configured to implement the steps in the foregoing methods. The function may be implemented by hardware, or may be implemented by hardware executing corresponding software. The hardware or the software includes one or more modules corresponding to the foregoing functions.

In a possible design, a structure of the communication apparatus includes a processing unit (or a processing module) and a communication unit (or a communication module). These units may perform corresponding functions in the foregoing method examples. For details, refer to the descriptions in the method provided in the first aspect, the third aspect, the fifth aspect, or the seventh aspect. Details are not described herein again.

For example, the communication apparatus has a function of implementing the method provided in the first aspect. The communication unit may be configured to communicate with the terminal device. The processing unit may be configured to: generate a sequence corresponding to a first SSB; determine a first SSB frequency location; and send, based on the determined first SSB frequency location by using the communication unit, the sequence corresponding to the first SSB. The first SSB frequency location is associated with bandwidth of the first network, or the first SSB frequency location is related to a lowest frequency of the first network and/or a highest frequency of the first network.

For another example, the communication apparatus has a function of implementing the method provided in the third aspect. The processing unit may be configured to: generate a sequence corresponding to a first SSB; determine, based on a first SSB frequency location and a frequency range of the first network, a mapping manner of the sequence corresponding to the first SSB; and map, based on the determined mapping manner, the sequence corresponding to the first SSB. The communication unit may be configured to send the mapped sequence corresponding to the first SSB.

For another example, the communication apparatus has a function of implementing the method provided in the fifth aspect. The communication unit may be configured to communicate with the terminal device. The processing unit may be configured to: generate a sequence corresponding to a first SSB; determine a first SSB frequency location; and send, based on the determined first SSB frequency location by using the communication unit, the sequence corresponding to the first SSB. The first SSB frequency location $SS_{REF}$ meets:

$$SS_{REF} = N \times f_1 + M \times f_2$$

$f_1$ and $f_2$ are constants greater than 0. N is a coefficient of $f_1$, and N is a positive integer. A candidate value of M includes at least one integer greater than 5.

For another example, the communication apparatus has a function of implementing the method provided in the seventh aspect. The processing unit may be configured to: determine a first mapping manner of a PBCH in a first SSB; and map the PBCH to a resource of the first network based on the determined first mapping manner. The communication unit may be configured to send the mapped PBCH. The first mapping manner is one of Q preset mapping manners. Q is an integer greater than 1.

According to a tenth aspect, this application further provides a communication apparatus. The apparatus is a terminal device that performs communication in a first network or a chip in the terminal device. The communication apparatus has a function of implementing any method provided in the second aspect, the fourth aspect, the sixth aspect, or the eighth aspect. The communication apparatus may be implemented by hardware, or may be implemented by hardware executing corresponding software. The hardware or the software includes one or more units or modules corresponding to the function.

In a possible design, the communication apparatus includes a processor. The processor is configured to support the communication apparatus in performing a corresponding function of the terminal device in the foregoing method. The communication apparatus may further include a memory. The memory may be coupled to the processor. The memory stores program instructions and data that are necessary for the communication apparatus. Optionally, the communication apparatus further includes an interface circuit. The interface circuit is configured to support communication between the communication apparatus and a device such as a network device.

For example, the communication apparatus has a function of implementing the method provided in the second aspect.

The processor may be configured to: detect a sequence of a first SSB at a first SSB frequency location by using the interface circuit; and obtain time and frequency synchronization based on the sequence of the first SSB. The first SSB frequency location is associated with bandwidth of the first network, or the first SSB frequency location is related to a lowest frequency of the first network and/or a highest frequency of the first network.

For example, the communication apparatus has a function of implementing the method provided in the fourth aspect. The processor may be configured to: determine, based on a first SSB frequency location and a frequency range of the first network, a mapping manner of a sequence corresponding to a first SSB; and perform demapping on the first SSB based on the determined mapping manner.

For example, the communication apparatus has a function of implementing the method provided in the sixth aspect. The processor may be configured to: detect a sequence of a first SSB at a first SSB frequency location by using the interface circuit; and obtain time and frequency synchronization based on the sequence of the first SSB. The first SSB frequency location $SS_{REF}$ meets:

$$SS_{REF} = N \times f_1 + M \times f_2$$

$f_1$ and $f_2$ are constants greater than 0. N is a coefficient of $f_1$, and N is a positive integer. A candidate value of M includes at least one integer greater than 5.

For example, the communication apparatus has a function of implementing the method provided in the eighth aspect. The processor may be configured to: determine a first mapping manner of a PBCH in a first SSB; and receive the PBCH by using the interface circuit based on the determined first mapping manner.

In a possible design, the communication apparatus includes corresponding functional modules that are configured to implement the steps in the foregoing methods. The function may be implemented by hardware, or may be implemented by hardware executing corresponding software. The hardware or the software includes one or more modules corresponding to the foregoing functions.

In a possible design, a structure of the communication apparatus includes a processing unit (or a processing module) and a communication unit (or a communication module). These units may perform corresponding functions in the foregoing method examples. For details, refer to the descriptions in the method provided in the second aspect, the fourth aspect, the sixth aspect, or the eighth aspect. Details are not described herein again.

For example, the communication apparatus has a function of implementing the method provided in the second aspect. The communication unit is configured to communicate with the network device. The processing unit may be configured to: detect a sequence of a first SSB at a first SSB frequency location by using the communication unit; and obtain time and frequency synchronization based on the sequence of the first SSB. The first SSB frequency location is associated with bandwidth of the first network, or the first SSB frequency location is related to a lowest frequency of the first network and/or a highest frequency of the first network.

For example, the communication apparatus has a function of implementing the method provided in the fourth aspect. The processing unit may be configured to: determine, based on a first SSB frequency location and a frequency range of the first network, a mapping manner of a sequence corresponding to a first SSB, and perform demapping on the first SSB based on the determined mapping manner.

For example, the communication apparatus has a function of implementing the method provided in the sixth aspect. The communication unit is configured to communicate with the network device. The processing unit may be configured to: detect a sequence of a first SSB at a first SSB frequency location by using the communication unit; and obtain time and frequency synchronization based on the sequence of the first SSB. The first SSB frequency location $SS_{REF}$ meets:

$$SS_{REF} = N \times f_1 + M \times f_2$$

$f_1$ and $f_2$ are constants greater than 0. N is a coefficient of $f_1$, and N is a positive integer. A candidate value of M includes at least one integer greater than 5.

For example, the communication apparatus has a function of implementing the method provided in the eighth aspect. The communication unit is configured to communicate with the network device. The processing unit may be configured to: determine a first mapping manner of a PBCH in a first SSB; and receive the PBCH based on the determined first mapping manner by using the communication unit.

According to an eleventh aspect, a communication apparatus is provided. The communication apparatus includes a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement the method in the first aspect, the third aspect, the fifth aspect, or the seventh aspect and any possible design by using a logic circuit or by executing code instructions.

According to a twelfth aspect, a communication apparatus is provided. The communication apparatus includes a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement the method in the second aspect, the fourth aspect, the sixth aspect, or the eighth aspect and any possible design by using a logic circuit or by executing code instructions.

According to a thirteenth aspect, a computer-readable storage medium is provided. The computer-readable storage medium stores a computer program or instructions. When the computer program or the instructions are executed by a processor, the method in any one of the first aspect to the eighth aspect and any possible design is implemented.

According to a fourteenth aspect, a computer program product storing instructions is provided. When the instructions are run by a processor, the method in any one of the first aspect to the eighth aspect and any possible design is implemented.

According to a fifteenth aspect, a chip system is provided. The chip system includes a processor, and may further include a memory. The chip system is configured to implement the method in any one of the first aspect to the eighth aspect and any possible design. The chip system may include a chip, or may include a chip and another discrete component.

According to a sixteenth aspect, a communication system is provided. The system includes the apparatus (for example, the network device) according to the first aspect and the apparatus (for example, the terminal device) according to the second aspect.

According to a seventeenth aspect, a communication system is provided. The system includes the apparatus (for example, the network device) according to the third aspect and the apparatus (for example, the terminal device) according to the fourth aspect.

According to an eighteenth aspect, a communication system is provided. The system includes the apparatus (for example, the network device) according to the fifth aspect and the apparatus (for example, the terminal device) according to the sixth aspect.

According to a nineteenth aspect, a communication system is provided. The system includes the apparatus (for example, the network device) according to the seventh aspect and the apparatus (for example, the terminal device) according to the eighth aspect.

DESCRIPTION OF EMBODIMENTS

To make objectives, technical solutions, and advantages of embodiments of this application clearer, the following further describes embodiments of this application in detail with reference to the accompanying drawings.

In the following, some terms in embodiments of this application are explained and described to facilitate understanding by a person skilled in the art.

(1) A terminal device may be a device having a wireless transceiver function or a chip that can be disposed in any device, or may be referred to as user equipment (user equipment, UE), an access terminal, a subscriber unit, a subscriber station, a mobile station, a mobile console, a remote station, a remote terminal, a mobile device, a user terminal, a wireless communication device, a user agent, or a user apparatus. The terminal device in embodiments of this application may be a mobile phone (mobile phone), a tablet computer (Pad), a computer with a wireless transceiver function, a virtual reality (virtual reality, VR) terminal, an augmented reality (augmented reality, AR) terminal, a wireless terminal in industrial control (industrial control), a wireless terminal in self-driving (self-driving), a wireless terminal in video surveillance, a wearable terminal device, or the like.

A network device may be an apparatus configured to implement a function of an access network device. The access network device may be a device that communicates with a wireless terminal device over an air interface in an access network through one or more cells, for example, may be a next generation NodeB (next Generation NodeB, gNB) in an NR system, an evolved NodeB (evolved NodeB, eNB) in an LTE system, or the like The network device may alternatively be an apparatus that can support the network device in implementing the function of the access network device, for example, a chip system. The apparatus may be installed in the network device.

(2) A dedicated network may implement network signal coverage in a specific area, and provide a communication service for a specific user in organization, command, management, production, dispatching, and the like. For example, the dedicated network may be applied to scenarios such as a railway, a smart grid, public protection and disaster relief (public protection and disaster relief, PPDR). Bandwidth of the dedicated network is far less than bandwidth of an NR network. For example, the bandwidth of the dedicated network may be 3 MHz to 5 MHz, or may be another value that is far less than the bandwidth of the NR network.

Figure 1:
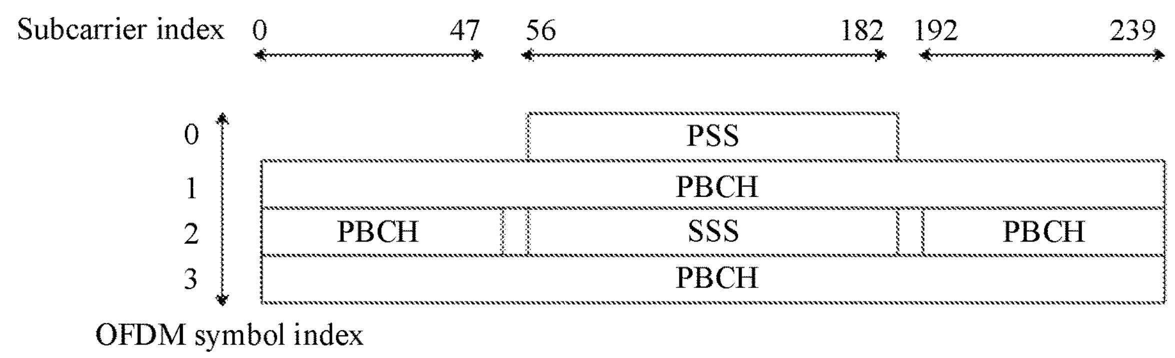
FIG. 1 is a schematic diagram of a format of an SSB in NR according to an embodiment of this application.

(3) SSB: In the NR system, an SSB includes a primary synchronization signal (primary synchronization signal, PSS), a secondary synchronization signal (secondary synchronization signal, SSS), and a physical broadcast channel (physical broadcast channel, PBCH). A format of the SSB in NR may be shown in FIG. 1. In time domain, one SSB occupies four consecutive orthogonal frequency division multiplexing (orthogonal frequency division multiplexing, OFDM) symbols. In frequency domain, one SSB occupies 240 consecutive subcarriers, and the 240 subcarriers are sequentially numbered from 0 to 239 in ascending order of frequencies. As shown in FIG. 1, a first OFDM symbol carries the PSS, and subcarriers numbered 0, 1, . . . , 55, 183, 184, . . . , and 239 are set to 0, and subcarriers numbered 56, 57, . . . , and 182 are subcarriers occupied by the PSS. To be specific, a sequence of symbols (sequence of symbols) corresponding to the PSS is mapped to the subcarriers numbered 56, 57, . . . , and 182 of the first OFDM symbol.

A second OFDM symbol and a fourth OFDM symbol carry the PBCH. To be specific, a sequence of symbols corresponding to the PBCH is mapped to subcarriers numbered 0 to 239 of the second OFDM symbol and the fourth OFDM symbol.

A third OFDM symbol carries the SSS and the PBCH. Subcarriers numbered 56, 57, . . . , and 182 carry the SSS. Subcarriers numbered 0, 1, . . . , 47, 192, 193, . . . , and 239 carry the PBCH. Other subcarriers are set to 0. To be specific, a sequence of symbols corresponding to the SSS is mapped to the subcarriers numbered 56, 57, . . . , and 182 of the third OFDM symbol. The sequence of symbols corresponding to the PBCH is mapped to the subcarriers numbered 0, 1, . . . , 47, 192, 193, . . . , and 239 of the third OFDM symbol.

It should be noted that, in embodiments of this application, a sequence of symbols corresponding to XXX may also be referred to as a sequence of symbols that correspond to the XXX, a sequence corresponding to the XXX, a sequence of symbols that forms the XXX, a sequence of symbols that form the XXX, a sequence that forms the XXX, or the like. For example, the sequence of symbols corresponding to the PSS may also be referred to as a sequence of symbols that correspond to the PSS, a sequence corresponding to the PSS, a sequence of symbols that forms the PSS, a sequence of symbols that form the PSS, a sequence that forms the PSS, or the like. In addition, because the sequence of symbols corresponding to the PBCH is a sequence of complex-valued symbols, the sequence of symbols corresponding to the PBCH may also be referred to as a sequence of complex-valued symbols (sequence of complex-valued symbols) corresponding to the PBCH. It should be understood that the sequence corresponding to the XXX in this application is only a description, and may also be understood as the XXX or a signal corresponding to the XXX. For example, a sequence corresponding to the SSB may be understood as the SSB, or may be understood as a signal corresponding to the SSB. For another example, a sequence corresponding to the PSS may be understood as the PSS, or may be understood as a signal corresponding to the PSS. The signal corresponding to the PSS/SSS may be referred to as a synchronization signal.

(4) Global Frequency Raster

In the NR system, a global frequency raster (global frequency raster) defines a group of radio frequency (radio frequency, RF) reference frequencies $F_{REF}$. The RF reference frequency is used in signaling to identify locations of an RF channel, a synchronization signal (synchronization signal, SS) block, and another element. The global frequency raster is defined for all frequencies from 0 GHz to 100 GHz. A granularity of the global frequency raster is $\Delta F_{Global}$.

When a frequency range is from 0 MHz to 24250 MHz, the RF reference frequency is specified by an NR absolute radio frequency channel number (NR absolute radio frequency channel number, NR-ARFCN) in a range (0 to 2016666) on the global frequency raster. A relationship between the NR-ARFCN and the RF reference frequency $F_{REF}$ (MHz) is provided by the following equation. $F_{REF\text{-}Offs}$ and $N_{Ref\text{-}Offs}$ are shown in Table 1. $N_{REF}$ is the NR-ARFCN.

$$F_{REF} = F_{REF-Offs} + \Delta F_{Global}(N_{REF} - N_{REF-Offs})$$

TABLE 1

| Frequency range (MHz) | $\Delta F_{Global}$ (kHz) | $F_{REF\text{-}Offs}$ (MHz) | $N_{REF\text{-}Offs}$ | $N_{REF}$ range |
|---|---|---|---|---|
| 0 to 3000 | 5 | 0 | 0 | 0 to 599999 |
| 3000 to 24250 | 15 | 3000 | 600000 | 600000 to 2016666 |

(5) Channel Raster

In the NR system, a channel raster defines a subset of a radio frequency reference frequency, and may be used to identify a radio frequency channel location in an uplink and a downlink. An RF reference frequency of an RF channel is mapped to a resource element on a carrier. For each operating frequency band, a frequency subset from the global frequency raster is applicable to the frequency band and forms a channel raster with a granularity of $\Delta F_{Raster}$. $\Delta F_{Raster}$ may be greater than or equal to $\Delta F_{Global}$. For example, for an NR operating frequency band with a 100 kHz channel raster, $\Delta F_{Raster}=20\times\Delta F_{Global}$.

Table 2 shows a mapping between an RF reference frequency on the channel raster and a corresponding resource element, which may be used to identify the RF channel location. This mapping depends on a total quantity of resource blocks (resource blocks, RBs) allocated to a channel, and is applicable to the uplink (uplink, UL) and the downlink (downlink, DL).

TABLE 2

| | $N_{RB}$ mod 2 = 0 | $N_{RB}$ mod 2 = 1 |
|---|---|---|
| Resource element index k | 0 | 6 |
| Physical resource block number $n_{PRB}$ | $n_{PRB} = \left\lfloor \frac{N_{RB}}{2} \right\rfloor$ | $n_{PRB} = \left\lfloor \frac{N_{RB}}{2} \right\rfloor$ |

k is a frequency domain index relative to a reference point. $N_{RB}$ is a total quantity of RBs allocated to a channel. $n_{PRB}$ is a physical resource block index in a bandwidth part (bandwidth part, BWP). a mod b indicates a remainder obtained by dividing a by b.

(6) Synchronization Raster

In the NR system, when explicit signaling for notifying a synchronization block location does not exist, a synchronization raster indicates a frequency location of a synchronization block that can be used by UE to obtain system information.

A global synchronization raster is defined for all frequencies. A frequency location of an SS block is defined as $SS_{REF}$, and a corresponding number is a global synchronization channel number (global synchronization channel number, GSCN). When a frequency range is from 0 MHz to 24250 MHz, all parameters of the $SS_{REF}$ and the GSCN in the frequency range are defined in Table 3.

TABLE 3

| Frequency range (Frequency range) | SSB frequency location $SS_{REF}$ | GSCN | GSCN Range |
|---|---|---|---|
| 0 MHz to 0 MHz | N × 1200 kHz + M × 50 kHz, N = 1:2499, M ϵ {1, 3, 5} | 3N + (M − 3)/2 | 2 to 7498 |
| 3000 MHz to 24250 MHz | 3000 MHz + N × 1.44 MHz N = 0:14756 | 7499 + N | 7499 to 22255 |

The synchronization raster may correspond to a location of a center frequency of a subcarrier whose subcarrier index is 120 of the SSB.

In embodiments of this application, "at least one" means one or more, and "a plurality of" means two or more. "And/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items" or a similar expression thereof means any combination of these items, including a singular item or any combination of plural items. For example, at least one of a, b, or c may indicate a, b, c, a and b, a and c, b and c, or a, b, and c, where a, b, and c may be in a singular form or a plural form.

In addition, unless otherwise stated, in embodiments of this application, ordinal numbers such as "first" and "second" are intended to distinguish between a plurality of objects, but are not intended to limit sizes, content, orders, time sequences, priorities, importance, or the like of the plurality of objects. For example, a first resource and a second resource are only used for distinguishing between different resources, but do not indicate different locations, sizes, priorities, importance, or the like of the two resources.

The foregoing describes some terms in embodiments of this application. The following describes technical features in embodiments of this application.

When powered on, a terminal device needs to perform cell search, and obtains downlink time and frequency synchronization by using an SSB. After the terminal device is powered on, the terminal device blindly detects, based on a preset step, possible frequency locations of all SSBs in a frequency band supported by the terminal device. In an NR system, the possible frequency location of the SSB and the step for blind detection performed by the terminal device are defined. A synchronization raster (synchronization raster) is introduced in NR. The synchronization raster defines a series of frequency locations at which the SSBs may appear, as shown in Table 3 above.

For ease of understanding, an example in which a frequency range is from 0 MHz to 3000 MHz is used for description.

When N=1, and M=1, $SS_{REF}$=N×1200 kHz+M×50 kHz=1250 kHz, and GSCN=3N+(M−3)/2=2.

When N=1, and M=3, $SS_{REF}$=N×1200 kHz+M×50 kHz=1350 kHz, and GSCN=3N+(M−3)/2=3.

When N=1, and M=5, $SS_{REF}$=N×1200 kHz+M×50 kHz=1450 kHz, and GSCN=3N+(M−3)/2=4.

Figure 2:
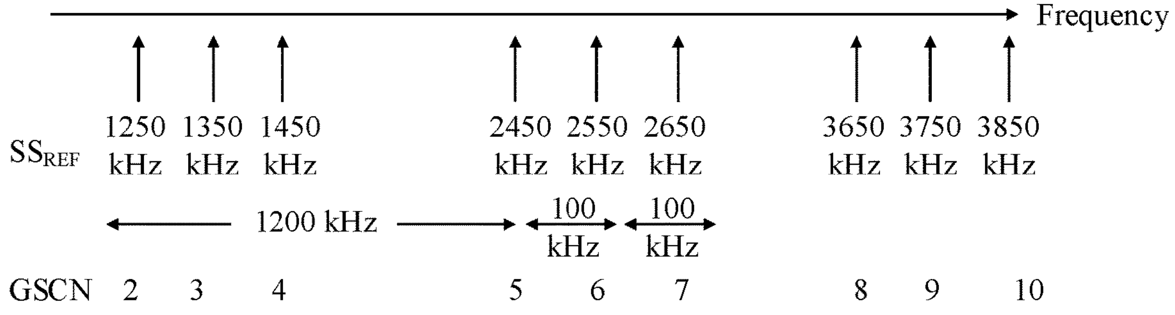
FIG. 2 is a schematic diagram of an SSB frequency location according to an embodiment of this application.
Figure 3:
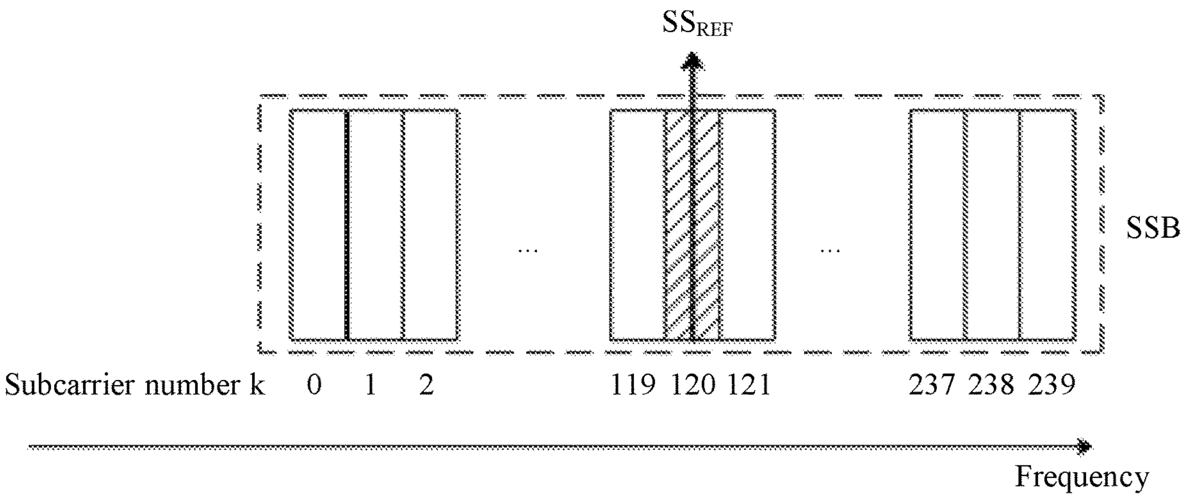
FIG. 3 is a schematic diagram of an $SS_{REF}$ according to an embodiment of this application.

By analogy, possible values of N and M are substituted into the foregoing formula to obtain possible frequency locations of all SSBs in the frequency range from 0 MHz to 3000 MHz. FIG. 2 is a schematic diagram of a synchronization raster. One vertical arrow indicates a possible frequency location of one SSB, and the synchronization raster may be understood as a plurality of vertical arrows in FIG. 2, namely, a series of frequency locations at which the SSBs may appear. $SS_{REF}$ corresponds to a central location of a subcarrier k in the SSB, where k=120, as shown in FIG. 3.

Figure 4:
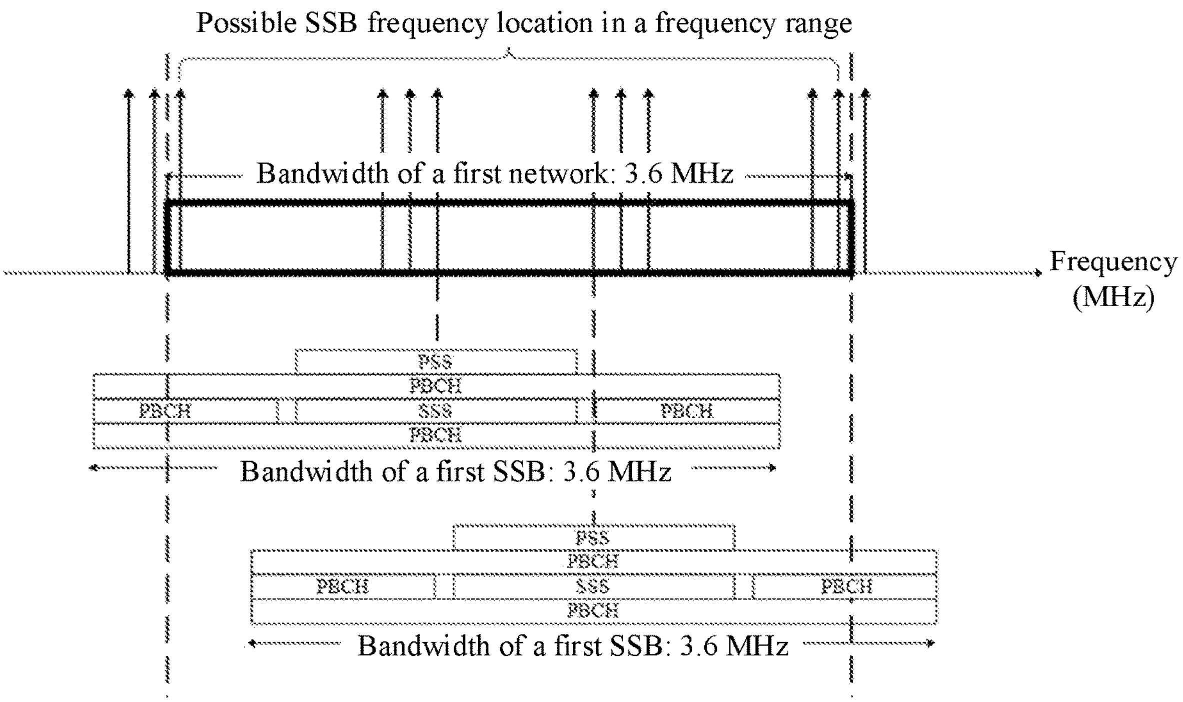
FIG. 4 is a schematic diagram of an SSB in a narrowband system such as a dedicated network according to an embodiment of this application.

Bandwidth of a bandwidth-limited network system such as a dedicated network is small. Therefore, a manner of sending the SSB in the NR system may cause a series of problems. For example, because the bandwidth is small, the SSB cannot be completely sent. As shown in FIG. 4, bandwidth of a dedicated network whose frequency band is below 3 GHz is used as an example. SSB frequency location $SS_{REF}$=N×1200 kHz+M×50 kHz. A solid vertical arrow in FIG. 4 is a possible frequency location of the SSB in a frequency range of the dedicated network. Based on the possible frequency location of the SSB in the frequency range shown in FIG. 4, the SSB cannot be completely sent. Therefore, how to receive and send the SSB in a narrow band system such as the dedicated network is an urgent problem to be resolved.

Based on this, embodiments of this application provide a communication method and apparatus, to receive and send an SSB in a narrow band system such as a dedicated network. The method and an apparatus are based on a same inventive concept. Because the method and the apparatus have a similar problem-resolving principle, for implementations of the apparatus and the method, refer to each other. Details are not repeated.

The communication method provided in this application may be applied to various communication systems, for example, an internet of things (internet of things, IoT), a narrow band internet of things (narrow band internet of things, NB-IoT), long term evolution (long term evolution, LTE), a 5th generation (5G) communication system, a hybrid architecture of LTE and 5G, a 5G new radio (new radio, NR) system, a new communication system emerging in 6G or future communication development, and the like. The 5G communication system described in this application may include at least one of a non-standalone (non-standalone, NSA) 5G communication system and a standalone (standalone, SA) 5G communication system. Alternatively, the communication system may be a machine to machine (machine to machine, M2M) network or another network.

Figure 5:
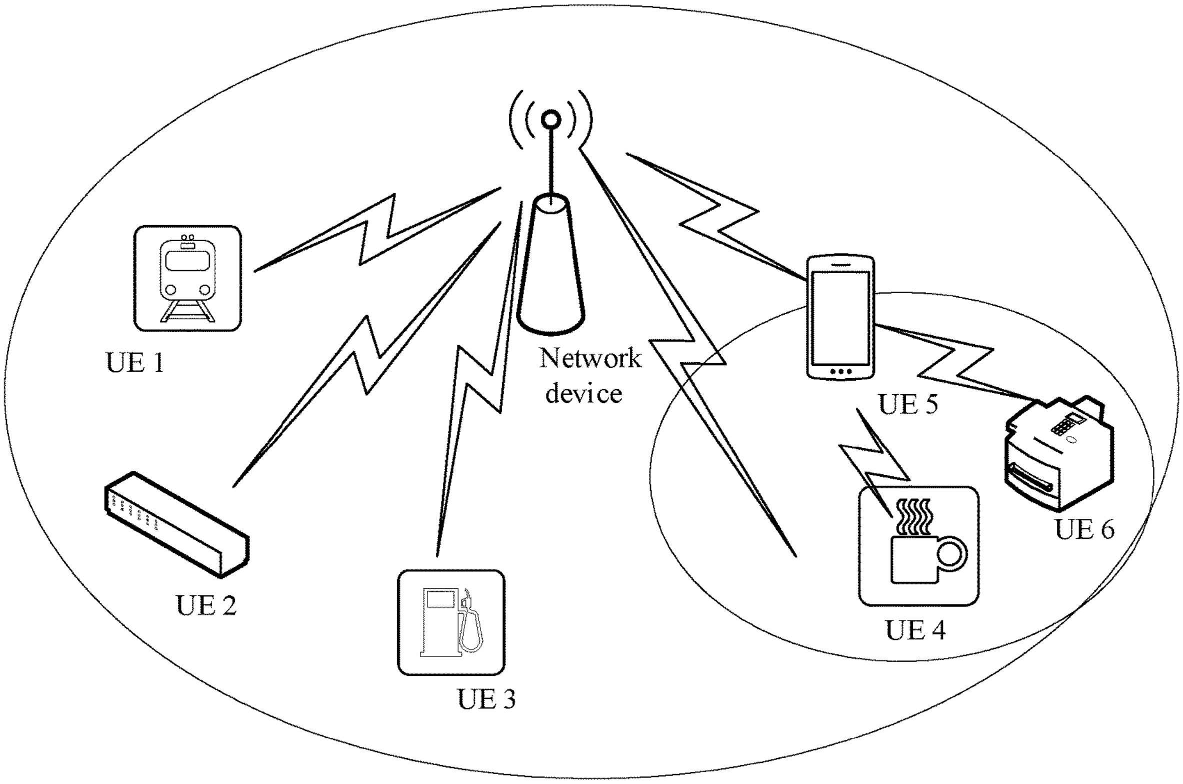
FIG. 5 is a schematic diagram of an architecture of a network system according to an embodiment of this application.

FIG. 5 shows a communication system according to an embodiment of this application. The communication system includes a network device and six terminal devices, namely, UE 1 to UE 6. In the communication system, the UE 1 to the UE 6 may send uplink data to the network device, and the network device may receive the uplink data sent by the UE 1 to the UE 6. In addition, the UE 4 to the UE 6 may form a communication subsystem. The network device may send downlink information to the UE 1, the UE 2, the UE 3, and the UE 5. The UE 5 may send the downlink information to the UE 4 and the UE 6 based on a device-to-device (device-to-device, D2D) technology. FIG. 5 is only a schematic diagram, and does not specifically limit a type of the communication system, a quantity and types of devices included in the communication system, and the like.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that, with evolution of the network architecture and emergence of a new service scenario, the technical solutions provided in embodiments of this application are also applicable to similar technical problems.

It should be noted that, in embodiments of this application, a first network is a network in which a network device or a terminal device or both are located, the network in which the network device is located may be a communication system in which the network device provides a communication service, and the network in which the terminal device is located may be a communication system that provides a communication service for the terminal device. In other words, the terminal device is in a coverage area of the first network, but the terminal device does not need to access the first network. In the communication method provided in embodiments of this application, the network device communicates with the terminal device in the first network. The first network may be a bandwidth-limited network such as a dedicated network. Network information (for example, bandwidth, a frequency range, a lowest frequency, a highest frequency, and a frequency band number) of the first network may be replaced with network information (for example, bandwidth, a frequency range, a lowest frequency, a highest frequency, and a frequency band number) of a cell on which the terminal device camps.

In embodiments of this application, a first SSB frequency location may correspond to a central location of a subcarrier k in a first SSB, where k=½K, and K is a total quantity of subcarriers in the first SSB. For example, the first SSB occupies 240 subcarriers in frequency domain, and the first SSB frequency location may correspond to a central location of a subcarrier 120 in the first SSB.

The following describes the technical solutions in embodiments of this application with reference to accompanying drawings in embodiments of this application.

Figure 6:
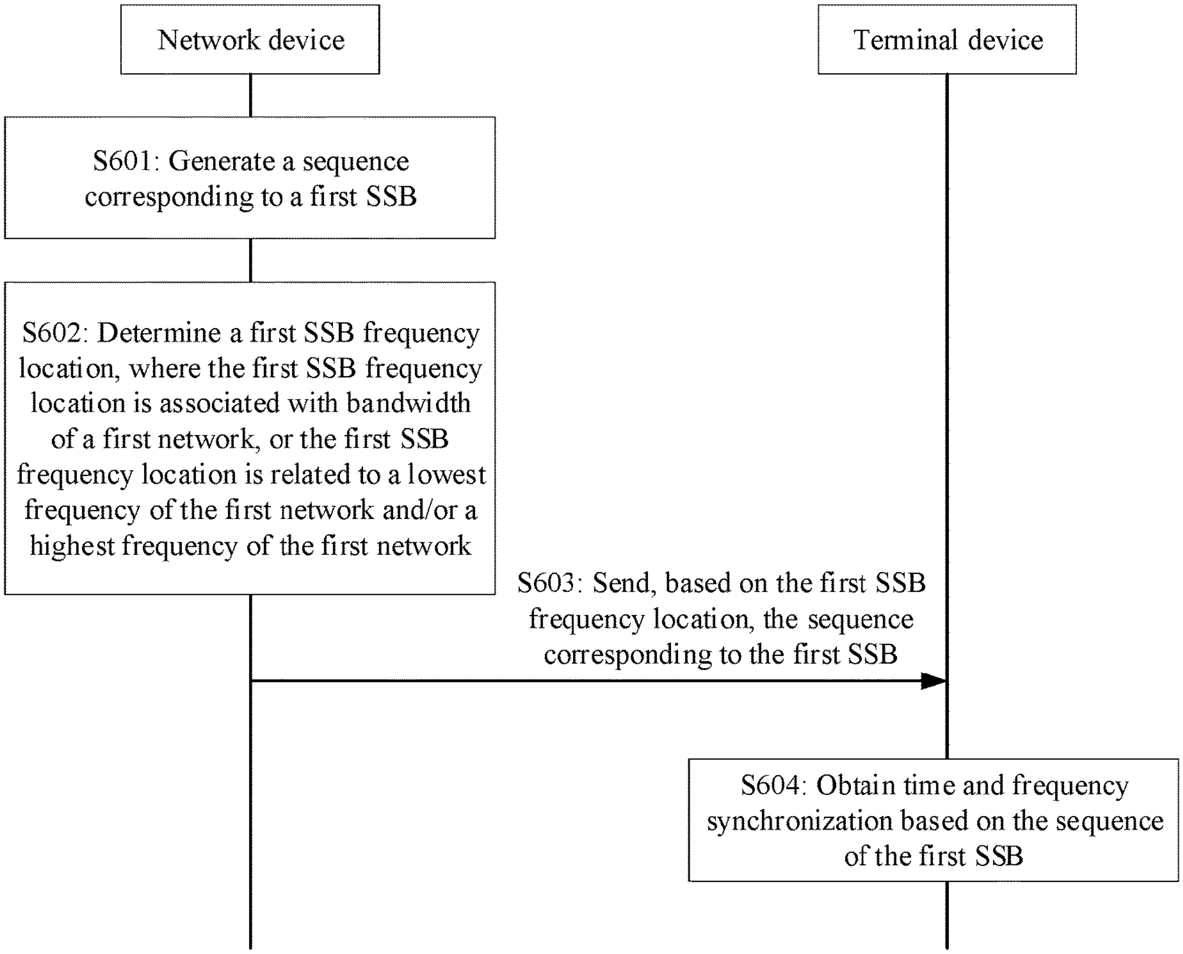
FIG. 6 is a schematic flowchart of a communication method according to an embodiment of this application.

FIG. 6 is a schematic flowchart of a communication method according to this application. The method includes the following steps.

S601: A network device generates a sequence corresponding to a first SSB.

The sequence corresponding to the first SSB may include a sequence corresponding to a synchronization signal and a sequence corresponding to a PBCH. The synchronization signal may include a PSS and an SSS, and the sequence corresponding to the synchronization signal may include a sequence corresponding to the PSS and a sequence corresponding to the SSS.

S602: The network device determines a first SSB frequency location.

The first SSB frequency location is associated with bandwidth of a first network. Alternatively, the first SSB frequency location is related to a lowest frequency of the first network and/or a highest frequency of the first network. The bandwidth of the first network may be understood as a width of a frequency band corresponding to the first network, or may be understood as a difference between a highest frequency and a lowest frequency in a frequency range of the first network.

In an implementation in which the first SSB frequency location is associated with the bandwidth of the first network, the first SSB frequency location $SS_{REF}$ may meet the following formula, or it may be understood that the first SSB frequency location $SS_{REF}$ is determined by using the following formula:

$$SS_{REF} = N \times f_1 + M \times f_2$$

$f_1$ and $f_2$ are constants greater than 0. For example, $f_1$ may be 1200 kHz, $f_2$ may be 50 kHz, and then the foregoing formula is $SS_{REF}$=N×1200 kHz+M×50 kHz.

N is a coefficient of $f_1$, and N is a positive integer. For example, N is a positive integer less than 2500.

A value of M is associated with the bandwidth of the first network. It may be understood that there may be an association relationship between the bandwidth and the value of M, so that the network device and a terminal device may determine the value of M based on the bandwidth of the first network. For example, it is assumed that values of M include {1, 3, 5}, M=1 corresponds to bandwidth 1, M=3 corresponds to bandwidth 2, and M=5 corresponds to bandwidth 3, as shown in Table 4.

TABLE 4

| Bandwidth | Value of M |
|---|---|
| Bandwidth 1 | 1 |
| Bandwidth 2 | 3 |
| Bandwidth 3 | 5 |
| . . . | . . . |

Based on the association relationship shown in Table 4, the terminal device and the network device may determine a corresponding value of M based on the bandwidth of the first network. For example, if the bandwidth of the first network is the bandwidth 2, the value of M may be 3.

The association relationship between the value of M and the bandwidth in Table 4 is only an example for description. The value of M and the bandwidth is not limited to a one-to-one relationship in this application. In a specific embodiment, the bandwidth may correspond to a plurality of values of M. For example, the bandwidth 1 corresponds to M={1, 3}, the bandwidth 2 corresponds to M={1, 5}, and the bandwidth 3 corresponds to M={3}, as shown in Table 5.

TABLE 5

| Bandwidth | Value of M |
|---|---|
| Bandwidth 1 | 1, 3 |
| Bandwidth 2 | 1, 5 |
| Bandwidth 3 | 3 |
| . . . | . . . |

It should be understood that the value of M in Table 4 and Table 5 is only an example for description. M may alternatively be another value. This is not limited herein.

In this embodiment of this application, the value of M is associated with the bandwidth of the first network, so that the network device can determine a frequency domain position of the first SSB based on the corresponding value of M, and the terminal device can detect the first SSB at a possible SSB frequency location corresponding to the value of M. In the foregoing manner, a quantity of attempts made by the terminal device to receive the first SSB can be reduced, and therefore power consumption of the terminal device is reduced. The association relationship shown in Table 4 is used as an example. If the bandwidth of the first network is the bandwidth 1, the terminal device attempts to receive the first SSB at an SSB frequency location $SS_{REF}$=N×1200 kHz+1×50 kHz corresponding to M=1. If N has 2500 values, the terminal device needs to make 2500 attempts in a worst case. However, if the foregoing manner is not used, the terminal device attempts to receive the first SSB at SSB frequency locations $SS_{REF}$=N×1200 kHz+M×50 kHz corresponding to all values of M. If N has 2500 values, and M has three values, the terminal device needs to make 2500×3 attempts in a worst case. It can be learned that, in the foregoing manner, a quantity of attempts made by the terminal device to receive an SSB can be greatly reduced.

In the foregoing implementation, the terminal device and the network device may predetermine the bandwidth of the first network. In an implementation, the terminal device and the network device may determine the bandwidth of the first network based on a frequency band number of the first network. An association relationship exists between the bandwidth of the first network and the frequency band number of the first network. For example, a protocol may define a correspondence between a frequency band number and bandwidth, so that the bandwidth of the first network may be determined based on the frequency band number of the first network. In the foregoing manner, the frequency band number of the first network is associated with the bandwidth, so that the terminal device does not blindly detect the bandwidth of the first network. This reduces the power consumption of the terminal device, improves energy saving effect, and can reduce complexity of the terminal device.

Figure 7:
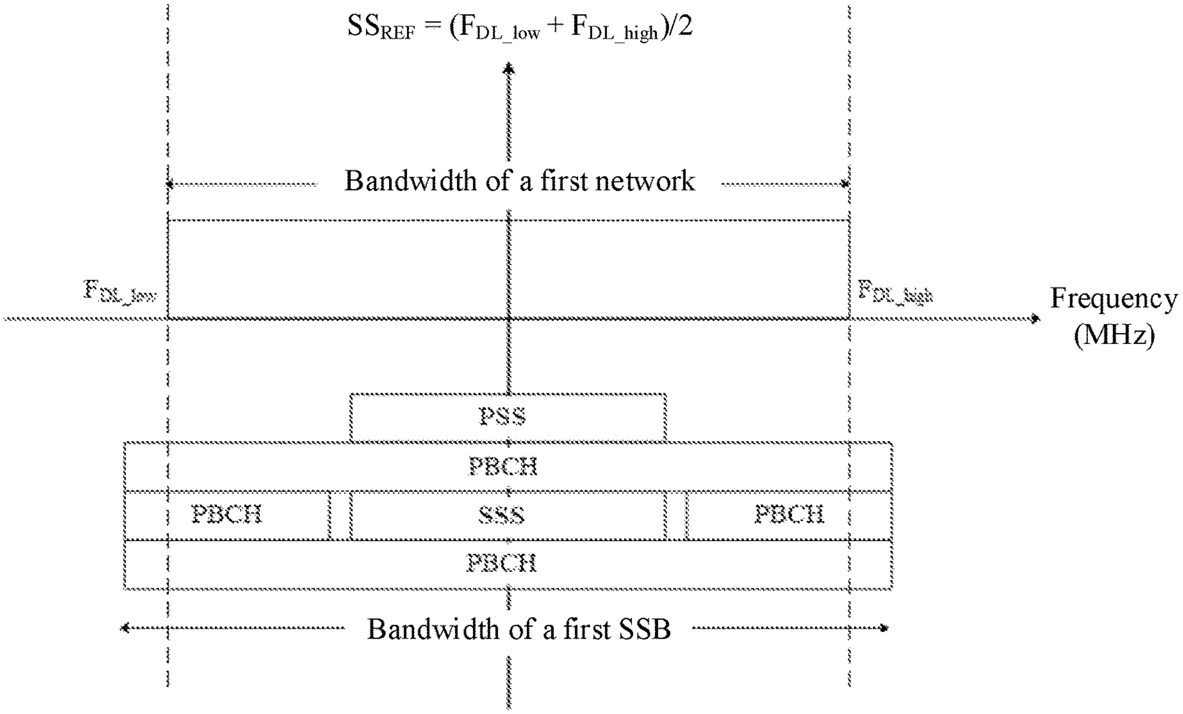
FIG. 7 is a schematic diagram of a first SSB frequency location according to an embodiment of this application.

In an implementation in which the first SSB frequency location is related to the lowest frequency of the first network and/or the highest frequency of the first network, the first SSB frequency location $SS_{REF}$ meets: $SS_{REF}=(F_{DL\_low}+F_{DL\_high})/2$, as shown in FIG. 7. $F_{DL\_low}$ is the lowest frequency, and $F_{DL\_high}$ is the highest frequency. In the foregoing manner, the first SSB frequency location is aligned with a center frequency of the first network, so that it can be ensured, to some extent, that a synchronization signal of the first SSB is completely mapped into the frequency range of the first network.

Figure 8:
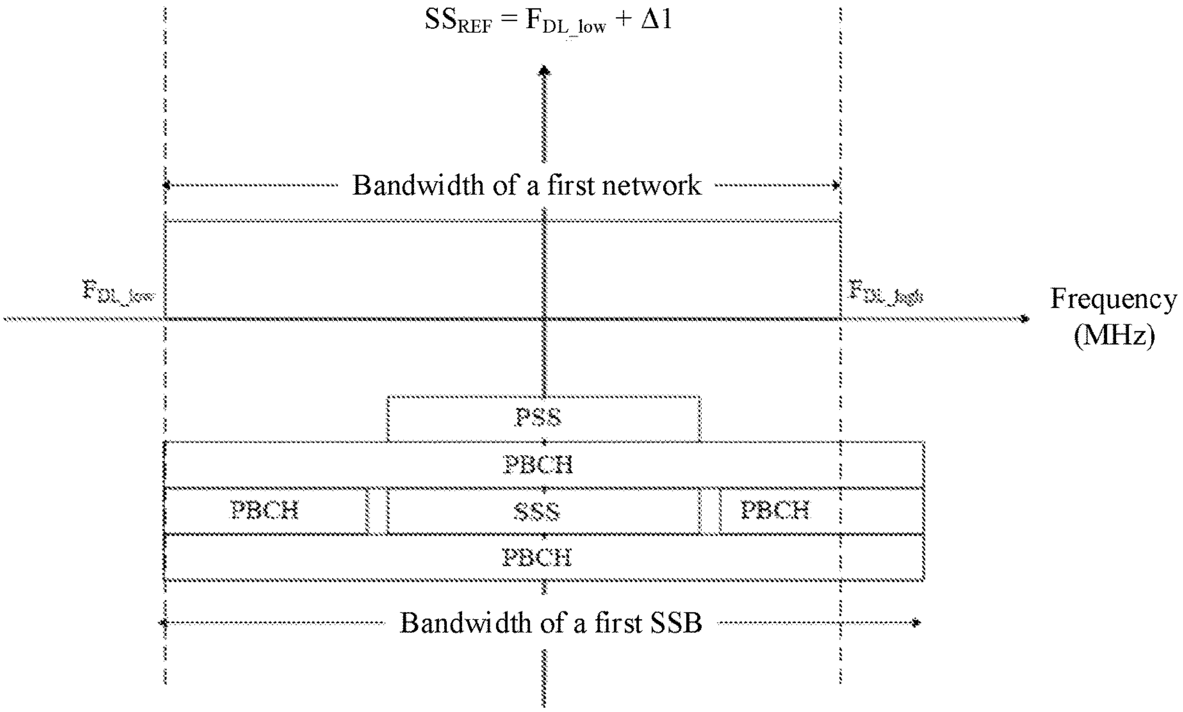
FIG. 8 is a schematic diagram of another first SSB frequency location according to an embodiment of this application.

Alternatively, the first SSB frequency location $SS_{REF}$ meets: $SS_{REF}={}_{DL\_low}+\Delta 1$, where Δ1 is an offset value, as shown in FIG. 8. Δ1 may be ½ of bandwidth corresponding to an SSB. Alternatively, Δ1 may be a value approximate to ½ of bandwidth corresponding to an SSB. In the foregoing manner, a lowest frequency of the first SSB is aligned with the lowest frequency of the first network, so that a synchronization raster can be consistent with a channel raster. This can avoid, to some extent, a waste of resources caused by inconsistency between the synchronization raster and the channel raster, and improve resource utilization.

Figure 9:
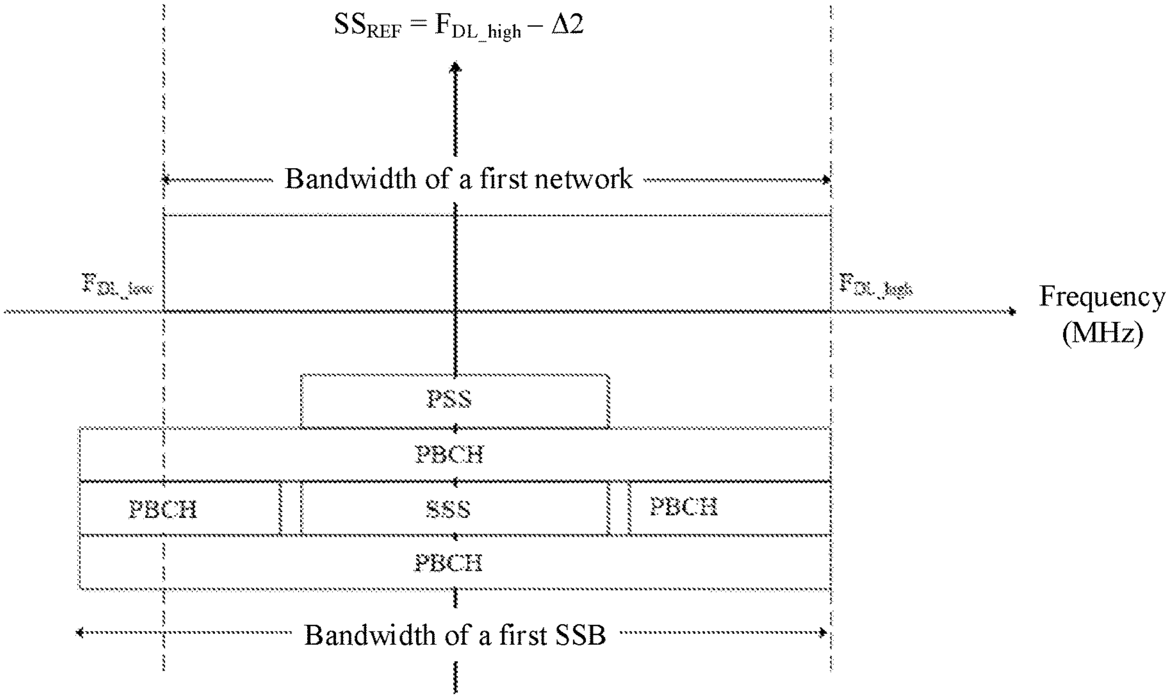
FIG. 9 is a schematic diagram of another first SSB frequency location according to an embodiment of this application.

Alternatively, the first SSB frequency location $SS_{REF}$ meets: $SS_{REF}=F_{DL\_high}-\Delta 2$, where Δ2 is an offset value, as shown in FIG. 9. Δ2 may be ½ of the bandwidth corresponding to an SSB. Alternatively, Δ2 may be a value approximate to ½ of the bandwidth corresponding to an SSB. In the foregoing manner, a highest frequency of the first SSB is aligned with the highest frequency of the first network, so that a synchronization raster can be consistent with a channel raster. This can avoid, to some extent, a waste of resources caused by inconsistency between the synchronization raster and the channel raster, and improve resource utilization.

In the foregoing three alignment manners, the terminal device can directly determine a frequency location for receiving the first SSB. Compared with a manner in which the terminal device makes a plurality of attempts to receive an SSB, this can reduce the power consumption of the terminal device, improve the energy saving effect, and reduce the complexity of the terminal device.

In the foregoing implementation, the terminal device and the network device may obtain the lowest frequency and/or the highest frequency of the first network in advance.

In an implementation, the terminal device and the network device determine the bandwidth of the first network based on the frequency band number of the first network, and determine the lowest frequency and/or the highest frequency based on the frequency band number and the bandwidth. An association relationship exists between the bandwidth of the first network and the frequency band number of the first network. For example, the terminal device and the network device may determine the bandwidth of the first network based on the frequency band number of the first network, and determine the frequency range of the first network based on the frequency band number and the bandwidth, to obtain the lowest frequency and/or the highest frequency of the first network.

In another implementation, the terminal device and the network device determine the lowest frequency and/or the highest frequency of the first network based on the frequency band number of the first network. An association relationship exists between the frequency range of the first network and the frequency band number of the first network.

In the foregoing manner, the frequency band number of the first network is associated with the bandwidth (or the frequency range), so that the terminal device does not blindly detect the frequency range of the first network. This reduces the power consumption of the terminal device, improves the energy saving effect, and can reduce the complexity of the terminal device.

In this embodiment of this application, the association relationship between the frequency band number and the bandwidth may be defined in a protocol. For example, the protocol may define an association relationship between the frequency band number and the frequency band. For another example, the protocol may further define an association relationship between the frequency band number and the frequency range. In this example, the terminal device and the network device may determine information such as the lowest frequency, highest frequency, and bandwidth of the first network based on the frequency range of the first network. The association relationship between the frequency band number and the bandwidth may alternatively be indicated by the network device.

S603: The network device sends, based on the first SSB frequency location, the sequence corresponding to the first SSB. Correspondingly, the terminal device receives, at the first SSB frequency location, the sequence corresponding to the first SSB.

Figure 10:
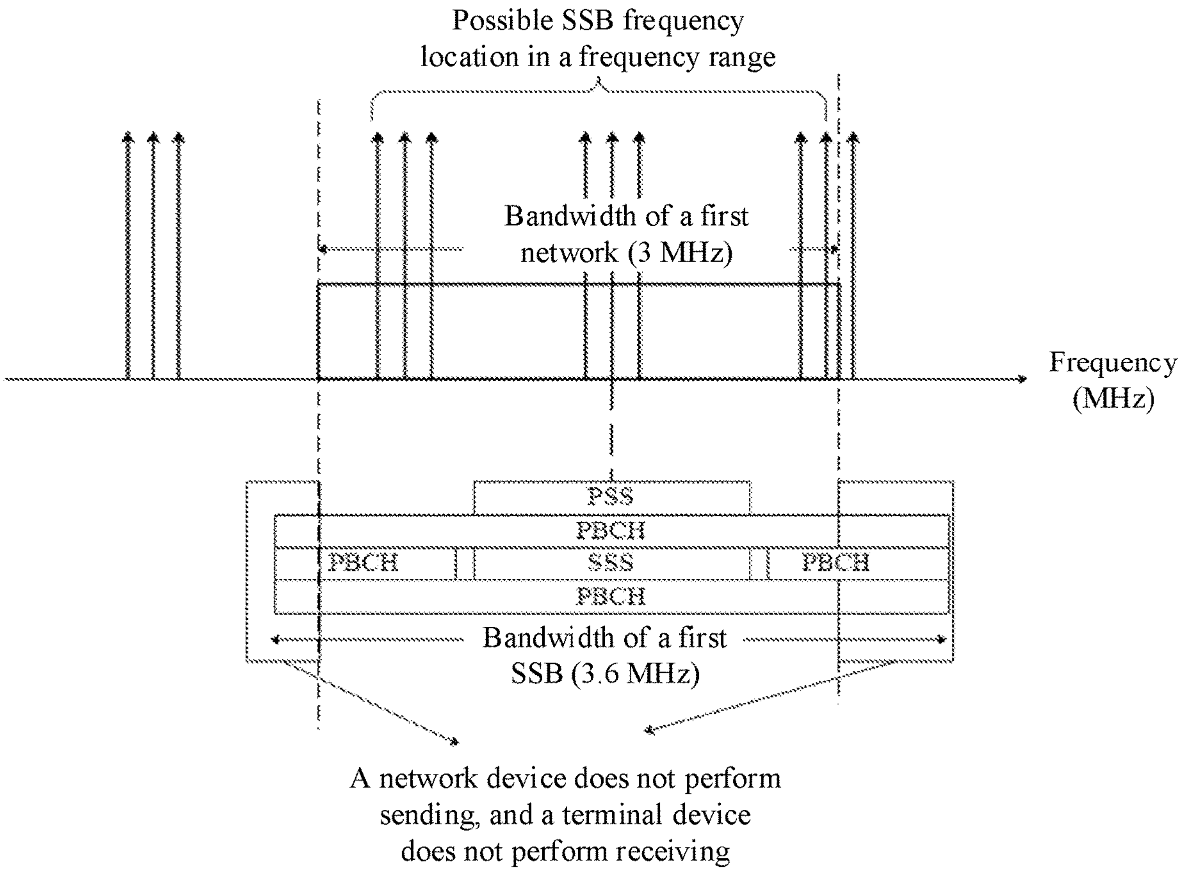
FIG. 10 is a schematic diagram of a mapping of a first SSB according to an embodiment of this application.

Before sending the sequence of the first SSB, the network device may map the sequence of the first SSB to a time-frequency resource based on the first SSB frequency location. Because the bandwidth of the first network is small, the sequence of the first SSB may not be completely mapped into the frequency range of the first network. To be specific, a part of the sequence of the first SSB is mapped into the frequency range of the first network, and the other part of the sequence is mapped outside the frequency range of the first network, as shown in FIG. 10. In this case, the network device may send the sequence that is of the first SSB and that is mapped into the frequency range of the first network, and may not send the sequence mapped outside the frequency range of the first network (or may puncture (puncture) the sequence mapped outside the frequency range of the first network). Correspondingly, when receiving the sequence of the first SSB, the terminal device may receive the sequence mapped into the frequency range of the first network, and may not receive the sequence mapped outside the frequency range of the first network.

In the foregoing manner, it can be ensured, to some extent, that the synchronization signal of the first SSB is completely sent, and therefore the terminal device can perform time and frequency synchronization based on the synchronization signal.

In the implementation in which the first SSB frequency location is associated with the bandwidth of the first network, when receiving the sequence corresponding to the first SSB, the terminal device may attempt to receive the first SSB (namely, detect the first SSB) at the possible SSB frequency location corresponding to the value of M that is associated with the bandwidth of the first network, until the sequence corresponding to the first SSB is received at the first SSB frequency location.

In a possible scenario, the SSB frequency location corresponding to the value of M may include an SSB frequency location that meets the following condition: When the first SSB is mapped based on the SSB frequency location, a part or all of the sequence of the synchronization signal of the first SSB is mapped outside the frequency range of the first network. For ease of description, the SSB frequency location is referred to as an invalid SSB frequency location below. Correspondingly, an SSB frequency location that is in the possible SSB frequency location corresponding to the value of M and that meets the following condition is referred to as a valid SSB frequency location: When the first SSB is mapped based on the SSB frequency location, all the sequence of the synchronization signal of the first SSB is mapped into the frequency range of the first network.

In this scenario, the network device may select the valid SSB frequency location to map the first SSB, to ensure that the sequence of the synchronization signal of the first SSB is completely sent. Correspondingly, when detecting the first SSB, the terminal device may skip the invalid SSB frequency location, in other words, the terminal device does not detect the first SSB at the invalid SSB frequency location. In this implementation, each of P SSB frequency locations for detecting the first SSB is the valid SSB frequency location. To be specific, each of the P SSB frequency locations meets: When the first SSB is mapped based on the SSB frequency location, all the synchronization signal in the first SSB is mapped into the frequency range of the first network. P is a positive integer. The P SSB frequency locations include the first SSB frequency location.

Figure 11:
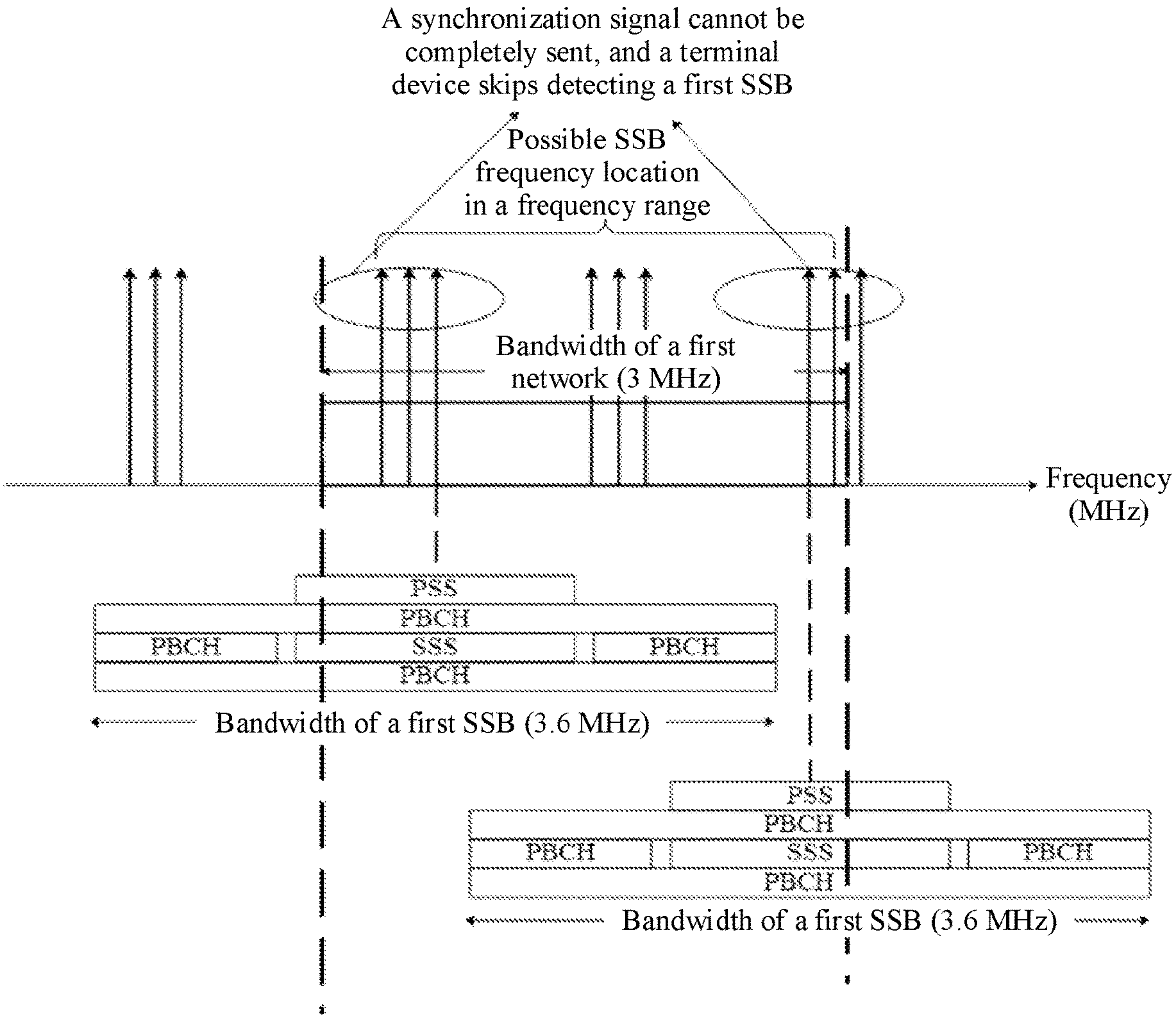
FIG. 11 is a schematic diagram of detecting an SSB by a terminal device according to an embodiment of this application.

For example, as shown in FIG. 11, the synchronization signal of the first SSB cannot be completely mapped into the frequency range of the first network at a location of a dashed arrow, and the synchronization signal of the first SSB can be completely mapped into the frequency range of the first network at a location of a solid arrow. When detecting the first SSB, the terminal device may skip the location of the dashed arrow, and detect the first SSB at the location of the solid arrow. In the foregoing manner, the power consumption of the terminal device can be reduced, and the energy saving effect can be improved.

In an implementation, the terminal device may determine, based on the frequency range of the first network and the bandwidth of the first SSB, whether the sequence of the synchronization signal can be completely mapped into the frequency range of the first network at each SSB frequency location.

S604: The terminal device obtains time and frequency synchronization based on the sequence of the first SSB.

Optionally, the terminal device may further obtain a system message based on the sequence of the first SSB. For example, the system message may be a master information block (master information block, MIB). Specifically, the terminal device may obtain time and frequency synchronization based on the synchronization signal (namely, the PSS and the SSS) in the first SSB, and obtain the system message based on the PBCH in the first SSB.

Optionally, the network device may map the sequence of the first SSB to a resource based on the bandwidth of the first SSB. Correspondingly, after receiving the sequence mapped into the frequency range of the first network, the terminal device may perform demapping based on the bandwidth of the first SSB. In the foregoing manner, the network device and the terminal device may have a consistent understanding of a mapping manner of the first SSB, and therefore communication accuracy can be improved.

In this embodiment of this application, the value of M is associated with bandwidth of a network, so that the network device can determine a frequency domain position of an SSB based on a corresponding value of M, and the terminal device can detect the SSB at a possible SSB frequency location corresponding to the value of M. In the foregoing manner, the quantity of attempts made by the terminal device to receive the SSB can be reduced, and therefore the power consumption of the terminal device can be reduced.

The SSB frequency location is determined based on a lowest frequency of the network and/or a highest frequency of the network, so that the terminal device can directly determine a frequency location for receiving the SSB. This reduces the power consumption of the terminal device, improves the energy saving effect, and reduces the complexity of the terminal device. In addition, the SSB frequency location is aligned with a center frequency of the network, so that it can be ensured, to some extent, that a synchronization signal of the SSB is completely mapped into a frequency range of the network, and the terminal device can perform time and frequency synchronization based on the synchronization signal. A lowest frequency of the SSB is aligned with the lowest frequency of the network, and a highest frequency of the SSB is aligned with the highest frequency of the network, so that the synchronization raster can be consistent with the channel raster. This can avoid, to some extent, the waste of resources caused by inconsistency between the synchronization raster and the channel raster, and improve the resource utilization.

Figure 12:
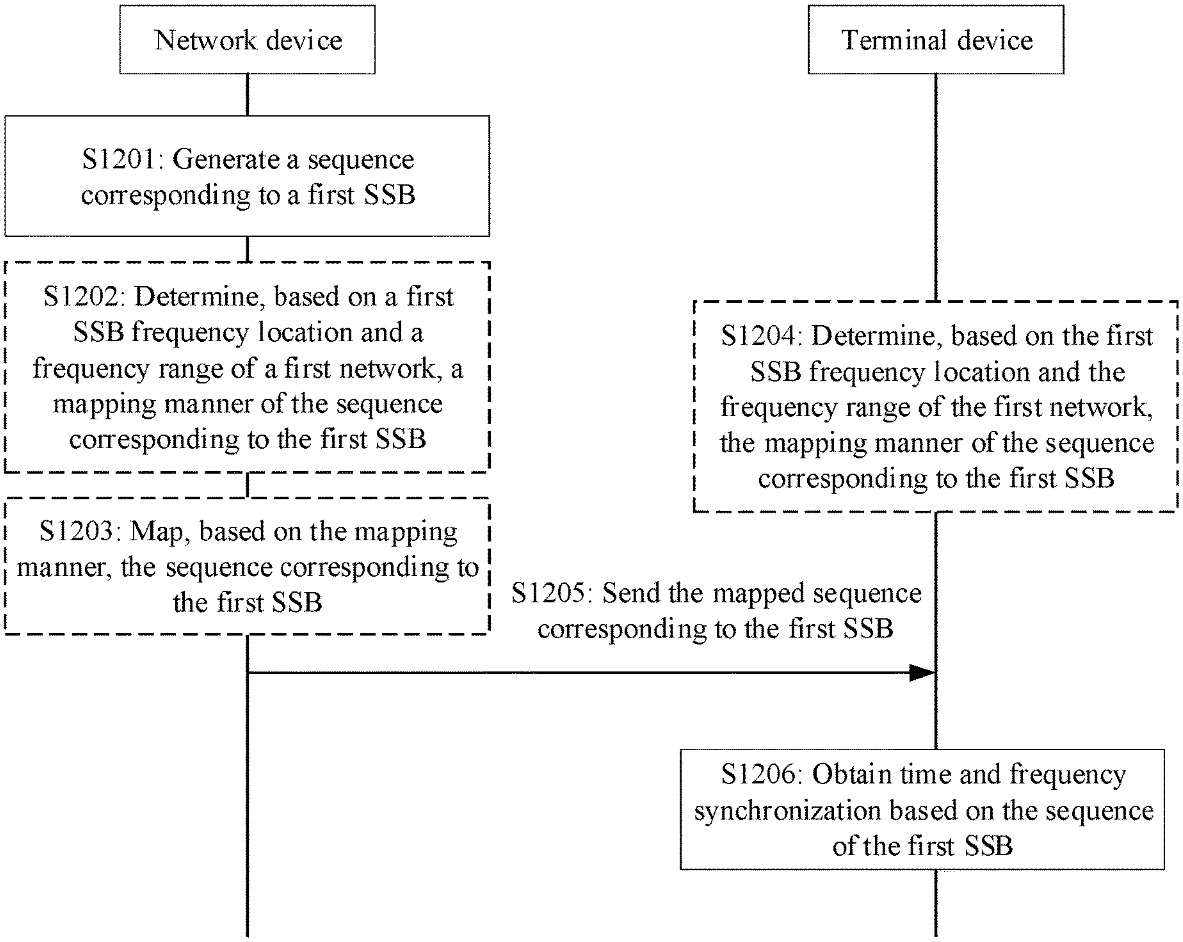
FIG. 12 is a schematic flowchart of a communication method according to an embodiment of this application.

FIG. 12 is a schematic flowchart of another communication method according to this application. The method includes the following steps.

S1201: A network device generates a sequence corresponding to a first SSB.

The sequence corresponding to the first SSB may include a sequence corresponding to a synchronization signal and a sequence corresponding to a PBCH. The synchronization signal may include a PSS and an SSS, and the sequence corresponding to the synchronization signal may include a sequence corresponding to the PSS and a sequence corresponding to the SSS.

S1202: The network device determines, based on a first SSB frequency location and a frequency range of a first network, a mapping manner of the sequence corresponding to the first SSB. The first network is a network in which a terminal device is located.

A method for determining the mapping manner of the first SSB by the network device is described in detail below. A method for determining the mapping manner of the first SSB by the terminal device in S1204 below is the same as the method used by the network device. Details are not described again.

In the communication method in FIG. 12, the first SSB frequency location may be associated with bandwidth of the first network, or may not be associated with the bandwidth of the first network. If the first SSB frequency location is associated with the bandwidth of the first network, refer to descriptions related to "the first SSB frequency location is associated with the bandwidth of the first network" in step S602. Details are not described herein again.

S1203: The network device maps, based on the mapping manner, the sequence corresponding to the first SSB.

It should be noted that the foregoing steps S1202 and S1203 may be optional steps.

S1204: The terminal device determines, based on the first SSB frequency location and the frequency range of the first network, the mapping manner of the sequence corresponding to the first SSB.

It should be noted that step S1204 may be an optional step.

S1205: The network device sends the mapped sequence corresponding to the first SSB. Correspondingly, the terminal device receives, based on the mapping manner, the sequence corresponding to the first SSB.

Before step S1205, the terminal device may attempt to receive the first SSB (namely, detect the first SSB) at at least one SSB frequency location, until the sequence corresponding to the first SSB is received at the first SSB frequency location.

In a possible scenario, there are two SSB frequency locations. One is an SSB frequency location that meets the following condition: When the first SSB is mapped based on the SSB frequency location, all the sequence of the synchronization signal of the first SSB is mapped outside the frequency range of the first network. For ease of description, the SSB frequency location is referred to as an invalid SSB frequency location below. The other is an SSB frequency location that does not meet the foregoing condition or meets the following condition: When the first SSB is mapped based on the SSB frequency location, all or a part of the sequence of the synchronization signal of the first SSB is mapped into the frequency range of the first network. The SSB frequency location is referred to as a valid SSB frequency location below.

In this scenario, the network device may select the valid SSB frequency location to map the first SSB, to ensure that the sequence of the synchronization signal of the first SSB is completely sent. Correspondingly, when detecting the first SSB, the terminal device may skip the invalid SSB frequency location, in other words, the terminal device does not detect the first SSB at the invalid SSB frequency location. In this case, all SSB frequency locations at which the terminal device attempts to receive the first SSB are valid SSB frequency locations. For a specific process, refer to the descriptions of a process in which the terminal device detects the first SSB in S603.

It should be noted that, in S603, the first SSB frequency location is associated with the bandwidth of the first network. Therefore, the SSB frequency location at which the terminal device detects the first SSB is a possible SSB frequency location corresponding to a value of M that is associated with the bandwidth of the first network.

In the communication method in FIG. 12, the first SSB frequency location may be associated with bandwidth of the first network, or may not be associated with the bandwidth of the first network. If the first SSB frequency location is associated with the bandwidth of the first network, the at least one SSB frequency location at which the terminal device detects the first SSB is the possible SSB frequency location corresponding to the value of M that is associated with the bandwidth of the first network. If the first SSB frequency location is not associated with the bandwidth of the first network, the at least one SSB frequency location at which the terminal device detects the first SSB may not be limited to the possible SSB frequency location corresponding to the value of M that is associated with the bandwidth of the first network.

S1206: The terminal device obtains time and frequency synchronization based on the sequence of the first SSB.

Optionally, the terminal device may further obtain a system message based on the sequence of the first SSB. For example, the system message may be an MIB. Specifically, the terminal device may obtain time and frequency synchronization based on the synchronization signal (namely, the PSS and the SSS) in the first SSB, and obtain the system message based on the PBCH in the first SSB.

In this embodiment of this application, the mapping manner of the sequence corresponding to the first SSB may be determined based on the first SSB frequency location and the frequency range of the first network. Compared with mapping an SSB in a fixed format in NR, the mapping manner of the SSB in this embodiment of this application is more flexible. Therefore, the mapping manner of the SSB may be adjusted based on a specific scenario, to more accurately send the SSB. For example, in a scenario in which an SSB cannot be completely mapped into a frequency range of a network, the SSB may be completely sent by adjusting a mapping manner of the SSB.

A possible implementation in which the network device determines the mapping manner of the first SSB is: If it is determined, based on the first SSB frequency location, bandwidth of the first SSB, and the frequency range of the first network, that a part of the sequence of the first SSB is mapped outside the frequency range of the first network, it may be determined that the mapping manner is: A first sequence is mapped to a first resource in the frequency range of the first network, and a second sequence is mapped to a second resource in the frequency range of the first network.

The first resource and the second resource do not overlap. A location of the first resource in the first network may be determined based on the first SSB frequency location, and a location of the second resource in the first network may not be limited. In an implementation, the second resource may be adjacent to the first resource. The first sequence meets: The first sequence may be mapped into the frequency range of the first network based on the first SSB frequency location. The second sequence meets: The second sequence is mapped outside the frequency range of the first network based on the first SSB frequency location, or the second sequence cannot be mapped into the frequency range of the first network based on the first SSB frequency location, or there is no resource for mapping in the frequency range of the first network.

Correspondingly, an implementation in which the terminal device determines the mapping manner of the first SSB may be: If it is determined, based on the first SSB frequency location, the bandwidth of the first SSB, and the frequency range of the first network, that a part of the sequence of the first SSB is mapped outside the frequency range of the first network, it may be determined that the mapping manner is: The first sequence is mapped to the first resource in the frequency range of the first network, and the second sequence is mapped to the second resource in the frequency range of the first network.

Therefore, when performing demapping on the first SSB based on the mapping manner, the terminal device may perform demapping on the first resource to obtain the first sequence, and perform demapping on the second resource to obtain the second sequence.

Optionally, after obtaining the first sequence and the second sequence through demapping, the terminal device may perform decoding after adjusting locations of the first sequence and the second sequence in a connection order. For example, if a tail of the first sequence is connected to a head of the second sequence, decoding is performed in an order of [the first sequence, the second sequence]. If a head of the first sequence is connected to a tail of the second sequence, decoding is performed in an order of [the second sequence, the first sequence].

In the foregoing implementation, the network device and the terminal device may determine the first sequence and the second sequence based on the first SSB frequency location and the frequency range of the first network. Specifically, the first sequence and the second sequence may be determined based on the first SSB frequency location, the bandwidth of the first SSB, and the frequency range of the first network.

Figure 13:
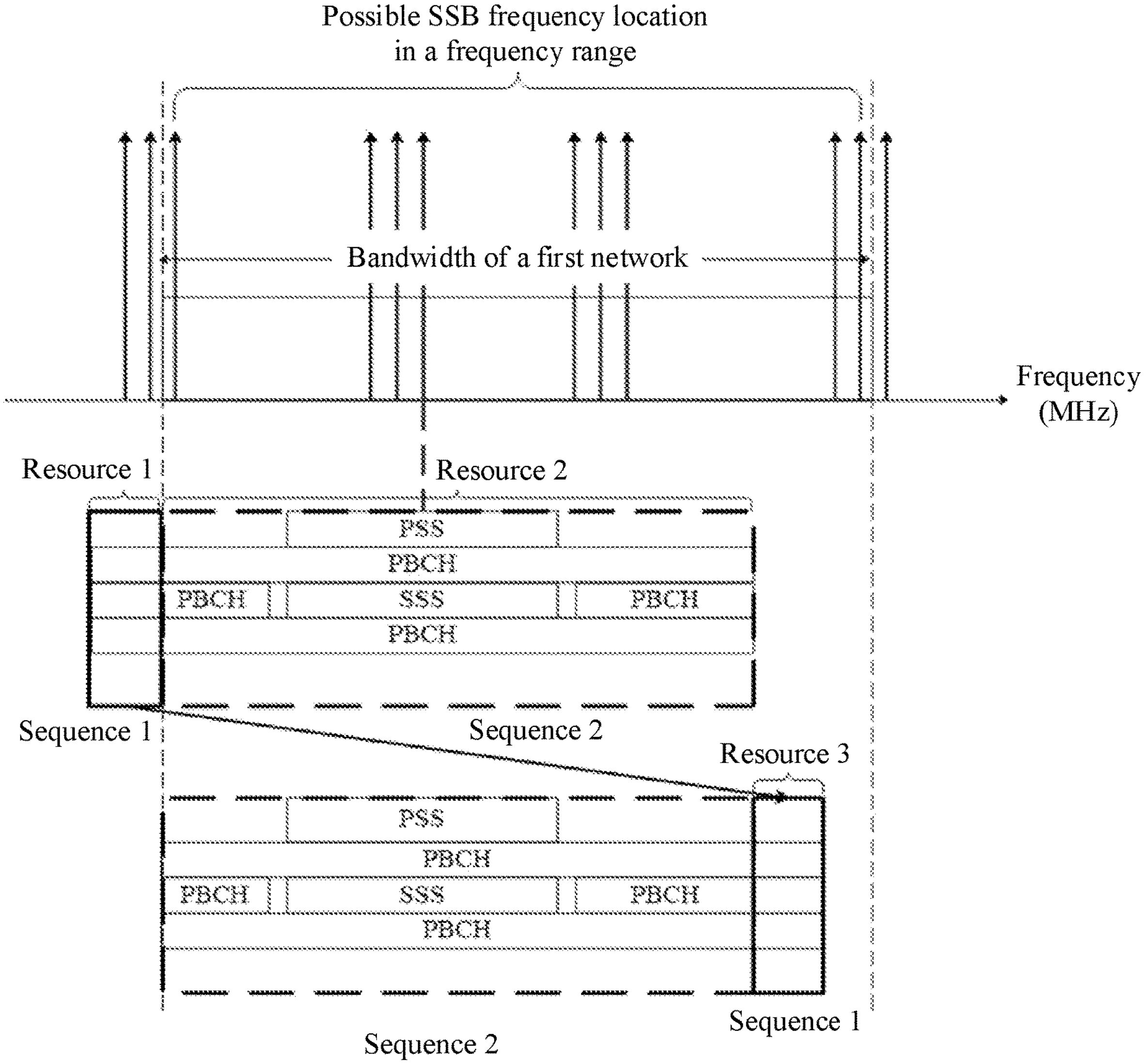
FIG. 13 is a schematic diagram of a mapping of a first SSB according to an embodiment of this application.

In an example, as shown in FIG. 13, based on the first SSB frequency location, a sequence 1 of the first SSB [sequence 1, sequence 2] needs to be mapped to a resource 1, and a sequence 2 needs to be mapped to a resource 2. The resource 2 is in the frequency range of the first network, the resource 1 is outside the frequency range of the first network, and a highest frequency of the resource 1 is a lowest frequency of the resource 2. The network device may map the sequence 1 to a resource 3, and map the sequence 2 to the resource 2 in the frequency range of the first network. A highest frequency of the resource 2 is less than or equal to a lowest frequency of the resource 3.

Correspondingly, the terminal device may determine, based on the first SSB frequency location and the frequency range of the first network, the mapping manner of the first SSB as: The sequence 2 is mapped to the resource 2, but the sequence 1 is mapped to the resource 3. In this case, the terminal device may perform demapping on the resource 3 based on the mapping manner to obtain the sequence 1, and perform demapping on the resource 2 to obtain the sequence 2. The terminal device may perform decoding after adjusting the sequence 1 and the sequence 2 to [sequence 1, sequence 2] in a connection order.

Figure 14:
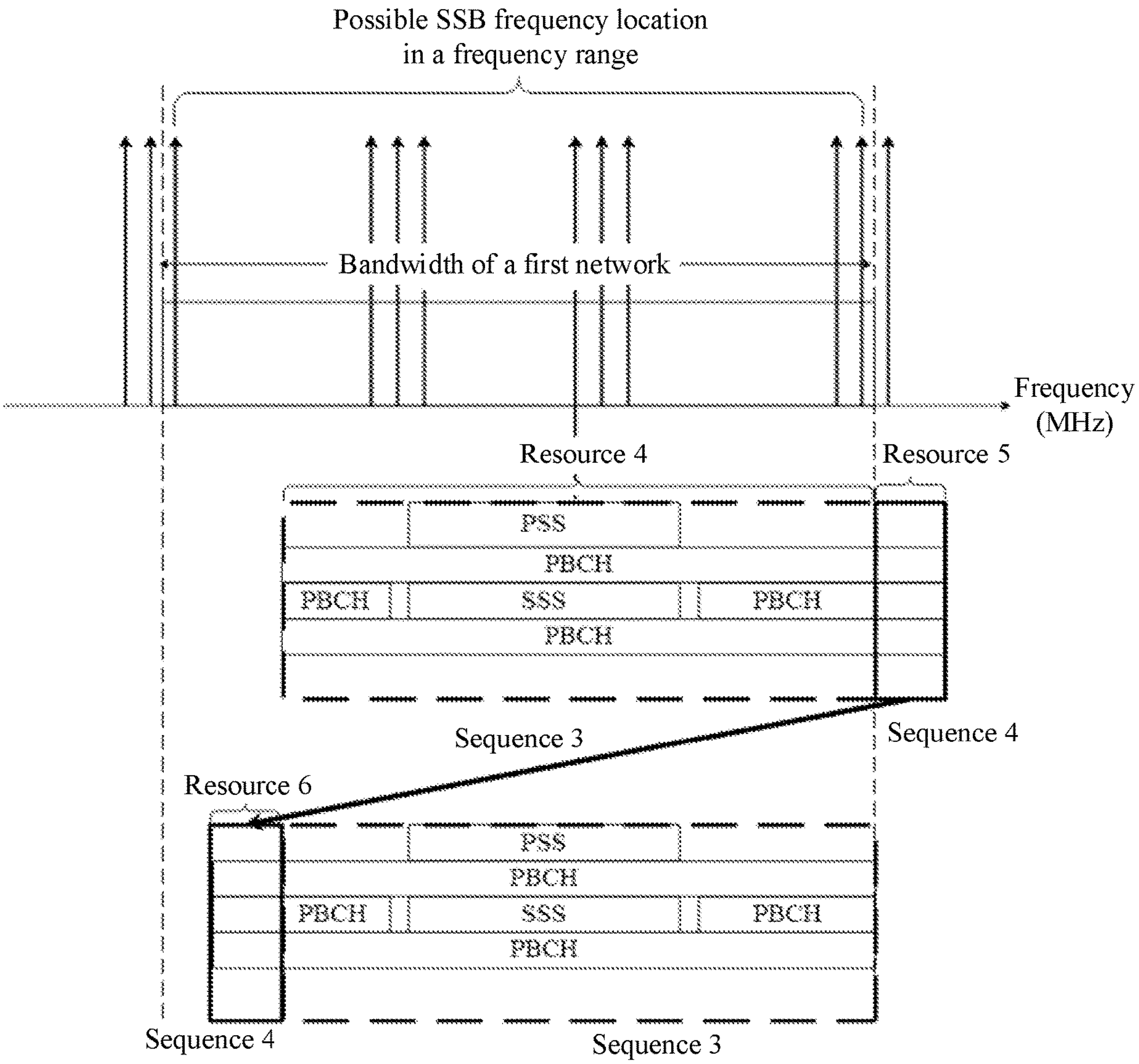
FIG. 14 is a schematic diagram of a mapping of a first SSB according to an embodiment of this application.

In another example, as shown in FIG. 14, based on the first SSB frequency location, a sequence 3 of the first SSB [sequence 3, sequence 4] needs to be mapped to a resource 4, and a sequence 4 needs to be mapped to a resource 5. The resource 4 is in the frequency range of the first network, the resource 5 is outside the frequency range of the first network, and a highest frequency of the resource 4 is a lowest frequency of the resource 5. The network device may map the sequence 3 to the resource 4, and map the sequence 4 to a resource 6 in the frequency range of the first network. A highest frequency of the resource 6 is less than or equal to a lowest frequency of the resource 4.

Correspondingly, the terminal device may determine, based on the first SSB frequency location and the frequency range of the first network, the mapping manner of the first SSB as: The sequence 3 is mapped to the resource 4, but the sequence 4 is mapped to the resource 6. In this case, the terminal device may perform demapping on the resource 4 based on the mapping manner to obtain the sequence 3, and perform demapping on the resource 6 to obtain the sequence 4. The terminal device may perform decoding after adjusting the sequence 3 and the sequence 4 to [sequence 3, sequence 4] based on a connection order.

In the foregoing mapping manner, a maximum index of a subcarrier in the first resource is less than a minimum index of a subcarrier in the second resource, and a minimum index of a sequence mapped to a first OFDM symbol of the first resource is greater than a maximum index of a sequence mapped to a first OFDM symbol of the second resource. FIG. 13 is used as an example. The first resource may be the resource 2, the second resource may be the resource 3, a maximum index of a subcarrier in the resource 2 is less than a minimum index of a subcarrier in the resource 3, and a minimum index of the sequence 2 on an $i^{th}$ OFDM symbol is greater than a minimum index of the sequence 1 on the OFDM symbol, where i={1, 2, 3, 4}. FIG. 14 is used as an example. The first resource may be the resource 6, the second resource may be the resource 4, a maximum index of a subcarrier in the resource 6 is less than a minimum index of a subcarrier in the resource 4, and a minimum index of the sequence 3 on an $i^{th}$ OFDM symbol is greater than a minimum index of the sequence 4 on the OFDM symbol, where i={1, 2, 3, 4}.

In this embodiment of this application, for a method for determining network information (such as the bandwidth, the frequency range, a lowest frequency, and/or a highest frequency) of the first network by the network device and the terminal device, refer to related descriptions in the communication method in FIG. 6. Details are not described herein again.

According to the method provided in FIG. 12, the part of the sequence that is in the first SSB and that cannot be mapped into the frequency range of the first network based on the first SSB frequency location may be mapped into the frequency range of the first network, so that it can be ensured that the first SSB can be completely sent in the first network. This improves spectrum resource utilization of a bandwidth-limited network system such as a dedicated network.

Figure 15:
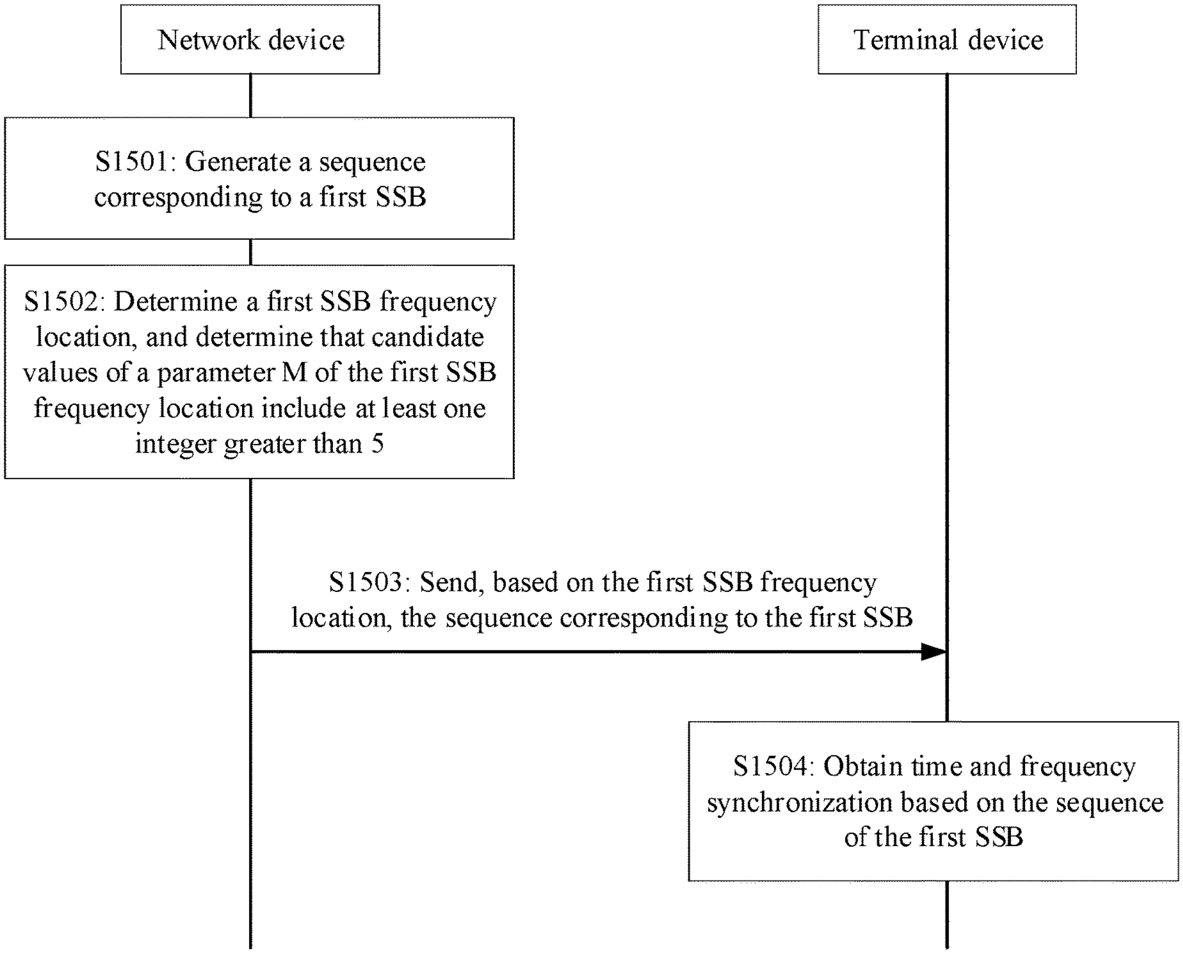
FIG. 15 is a schematic flowchart of a communication method according to an embodiment of this application.

FIG. 15 is a schematic flowchart of another communication method according to this application. The method includes the following steps.

S1501: A network device generates a sequence corresponding to a first SSB.

S1502: The network device determines a first SSB frequency location. The first SSB frequency location $SS_{REF}$ meets:

$$SS_{REF} = N \times f_1 + M \times f_2$$

$f_1$ and $f_2$ are constants greater than 0. For example, $f_1$ may be 1200 kHz, f 2 may be 50 kHz, and then the foregoing formula is $SS_{REF}$=N×1200 kHz+M×50 kHz.

N is a coefficient of $f_1$, and N is a positive integer.

A candidate value of M includes at least one integer greater than 5. In an implementation, a quantity of candidate values of M may be greater than 3.

In an example for description, the candidate values of M={1, 3, 5, 7, 9, 11, 13, 15, 17, 19, 21, 23}, or the candidate values of M={1, 3, 5, 7, 9, 11}, or the candidate values of M={1, 3, 5, 7, 9, 15, 17, 19, 23}, or the candidate values of M={1, 3, 5, 7, 9, 11, 12, 13, 15}, or the candidate values of M={1, 3, 5, 6, 7, 9, 10, 11}, or the like.

S1503: The network device sends, based on the first SSB frequency location, the sequence corresponding to the first SSB. Correspondingly, a terminal device receives, at the first SSB frequency location, the sequence of the first SSB.

Before step S1503, the terminal device may attempt to receive the first SSB (namely, detect the first SSB) at at least one SSB frequency location, until the sequence corresponding to the first SSB is received at the first SSB frequency location.

In a possible scenario, there are two SSB frequency locations. One is an SSB frequency location that meets the following condition: When the first SSB is mapped based on the SSB frequency location, a part or all of a sequence of a synchronization signal of the first SSB is mapped outside a frequency range of a first network. For ease of description, the SSB frequency location is referred to as an invalid SSB frequency location below. The other is an SSB frequency location that meets the following condition: When the first SSB is mapped based on the SSB frequency location, all the sequence of the synchronization signal of the first SSB is mapped into the frequency range of the first network. The SSB frequency location is referred to as a valid SSB frequency location below.

In this scenario, the network device may select the valid SSB frequency location to map the first SSB, to ensure that the sequence of the synchronization signal of the first SSB is completely sent. Correspondingly, when detecting the first SSB, the terminal device may skip the invalid SSB frequency location, in other words, the terminal device does not detect the first SSB at the invalid SSB frequency location. In this case, all SSB frequency locations at which the terminal device detects the first SSB are valid SSB frequency locations.

S1504: The terminal device obtains time and frequency synchronization based on the sequence of the first SSB.

Optionally, the terminal device may further obtain a system message based on the sequence of the first SSB. For example, the system message may be an MIB. Specifically, the terminal device may obtain time and frequency synchronization based on the synchronization signal (namely, a PSS and an SSS) in the first SSB, and obtain the system message based on a PBCH in the first SSB.

Figure 16:
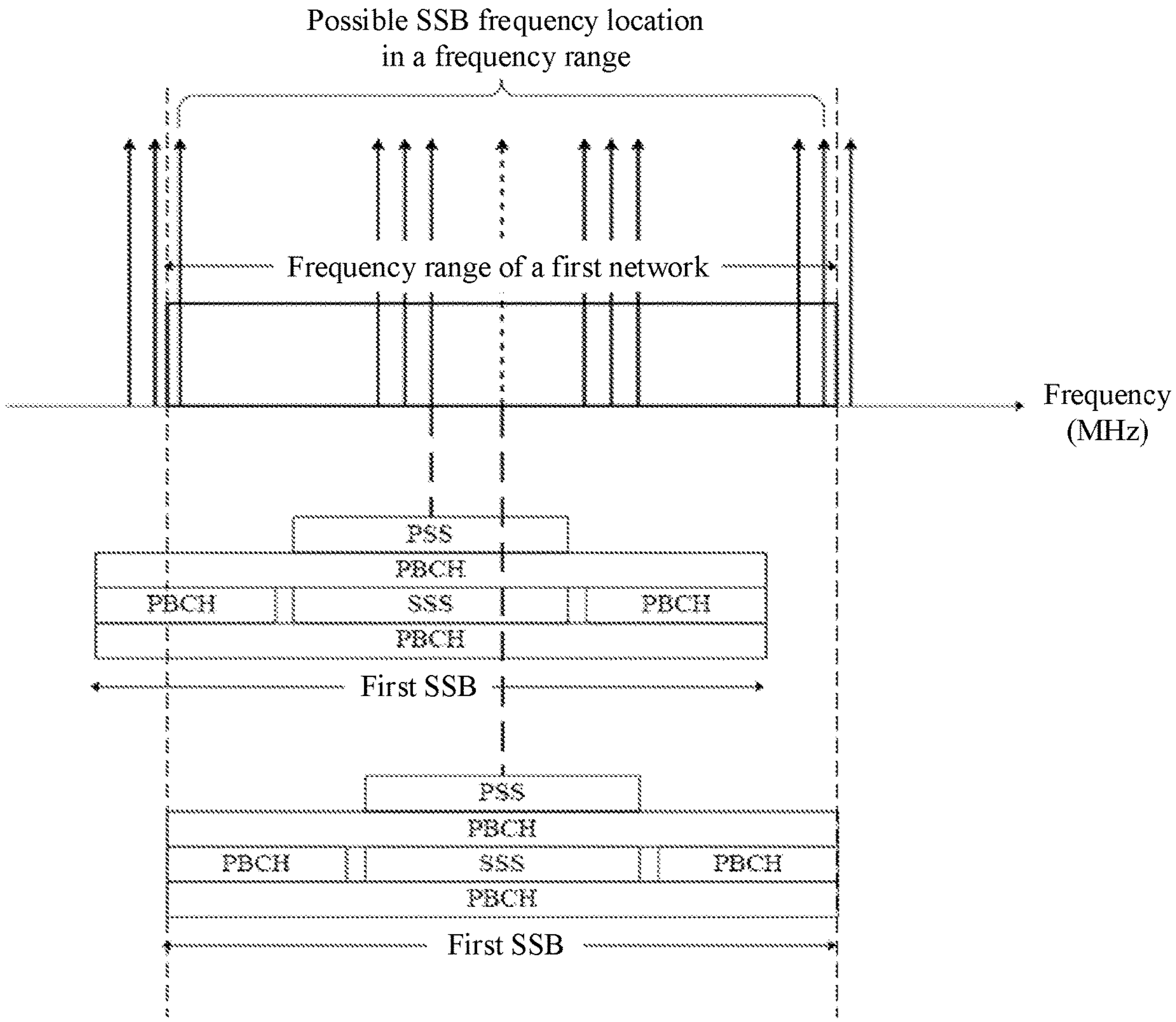
FIG. 16 is a schematic diagram of an SSB frequency location according to an embodiment of this application.

In the foregoing method, a quantity of SSB frequency locations may be increased by increasing a value of M. This can increase a possibility that the first SSB is completely sent in the first network, and improve spectrum resource utilization. For example, as shown in FIG. 16, the first SSB cannot be completely sent in the first network based on a location of a solid vertical arrow in the figure. The value of M is increased, so that the first SSB can be sent at a location of a dashed vertical arrow, and the first SSB can be completely sent in the first network based on the location.

In addition, according to the foregoing method, a possibility that the first SSB is aligned with the first network (for example, an SSB frequency location for sending the first SSB is aligned with a center frequency of the first network, a lowest frequency of the first SSB is aligned with a lowest frequency of the first network, or a highest frequency of the first SSB is aligned with a highest frequency of the first network) can be increased. This can avoid, to some extent, a waste of resources caused by inconsistency between a synchronization raster and a channel raster, and improve resource utilization.

Figure 17:
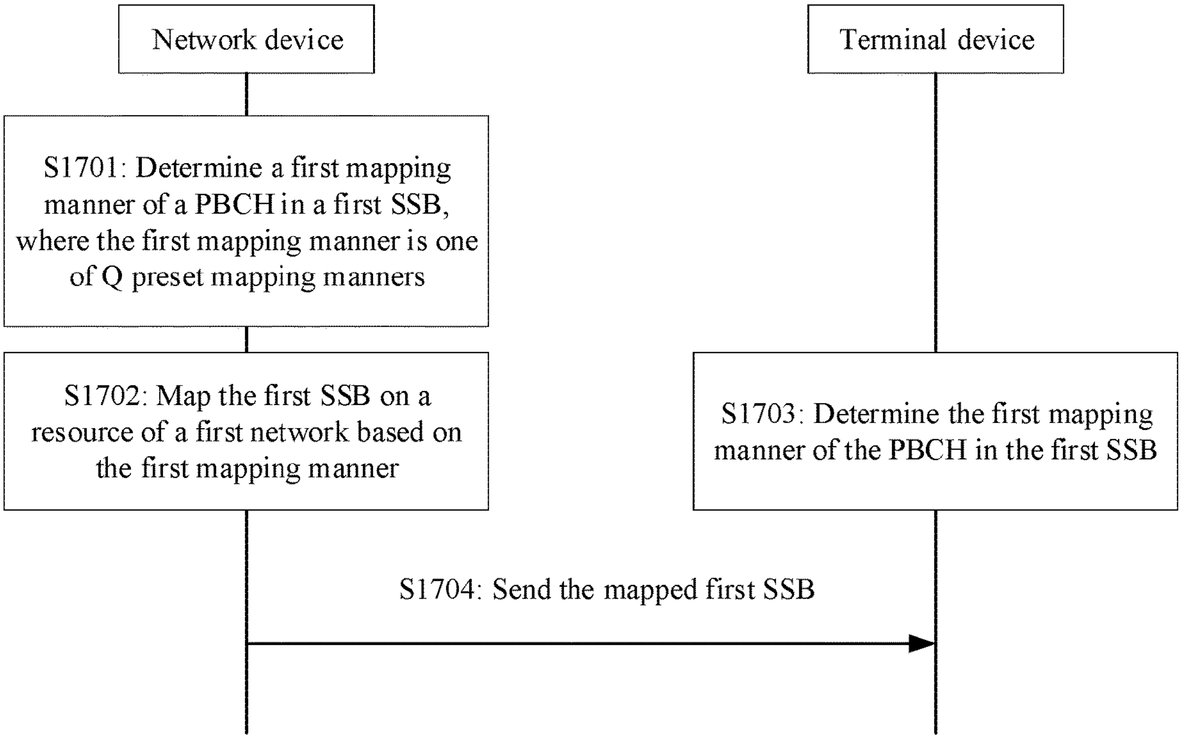
FIG. 17 is a schematic flowchart of a communication method according to an embodiment of this application.

FIG. 17 is a schematic flowchart of another communication method according to this application. The method includes the following steps.

S1701: A network device determines a first mapping manner of a PBCH in a first SSB. The first mapping manner is one of Q preset mapping manners. Q is an integer greater than 1.

The following describes the Q preset mapping manners by using an example. For example, the Q preset mapping manners may include at least two of the following five mapping manners.

Figure 18:
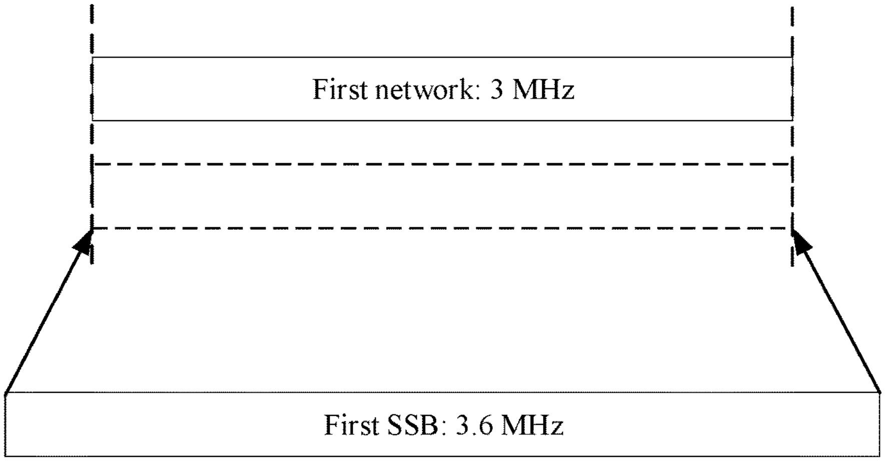
FIG. 18 is a schematic diagram of a mapping of a PBCH according to an embodiment of this application.

In a mapping manner 1, the PBCH is mapped based on bandwidth of a first network. For example, it is assumed that bandwidth of the first SSB is 3.6 MHz, and the bandwidth of the first network is 3 MHz. The mapping manner is coding the PBCH based on the bandwidth of 3 MHz, as shown in FIG. 18.

Figure 19:
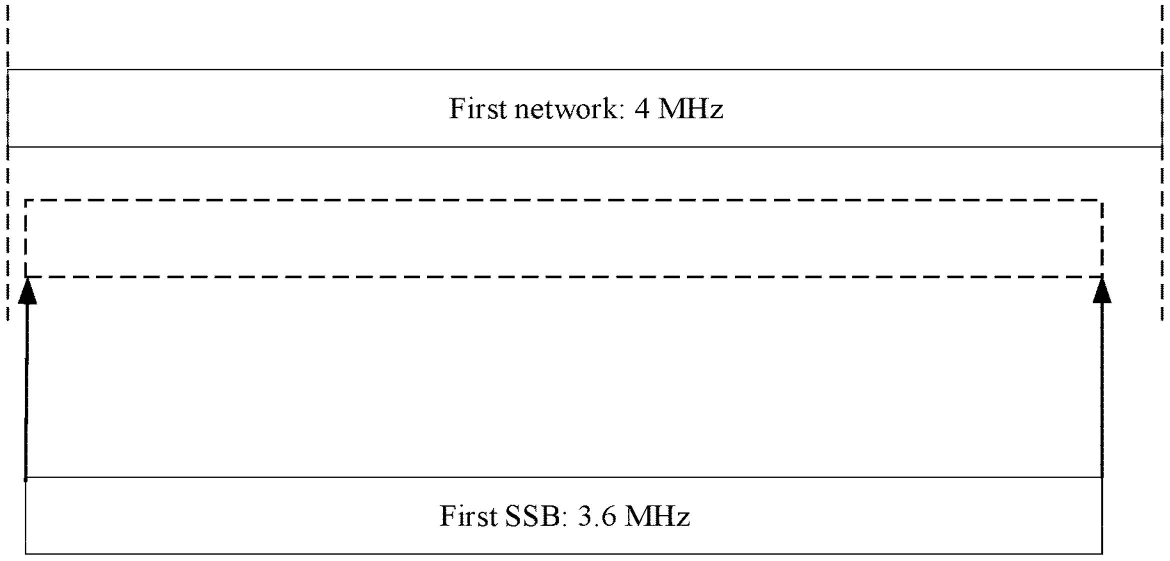
FIG. 19 is a schematic diagram of another mapping of PBCH according to an embodiment of this application.

In a mapping manner 2, the PBCH is mapped based on bandwidth of an SSB. For example, it is assumed that bandwidth of the first SSB is 3.6 MHz, and bandwidth of a first network is 4 MHz. The mapping manner is coding the PBCH based on the bandwidth of 3.6 MHz, as shown in FIG. 19.

Figure 20:
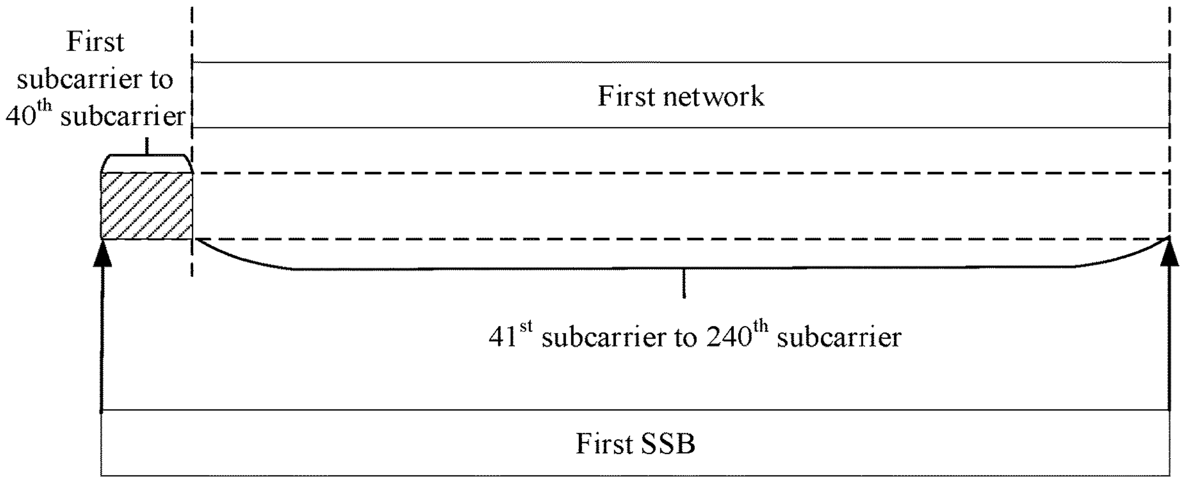
FIG. 20 is a schematic diagram of another mapping of PBCH according to an embodiment of this application.

In a mapping manner 3, the PBCH is mapped based on bandwidth of an SSB, and sequences mapped to frequency domain units after an $X^{th}$ frequency domain unit are sent in ascending order in frequency domain. X is a positive integer. For example, it is assumed that the first SSB occupies 240 subcarriers in frequency domain, and a first network includes 200 subcarriers. The mapping manner is mapping the first SSB based on the 240 subcarriers. A sequence mapped to a first subcarrier to a fortieth subcarrier is not sent (or which is referred to as puncturing the first subcarrier to the fortieth subcarrier). In this example, X=40, as shown in FIG. 20.

Figure 21:
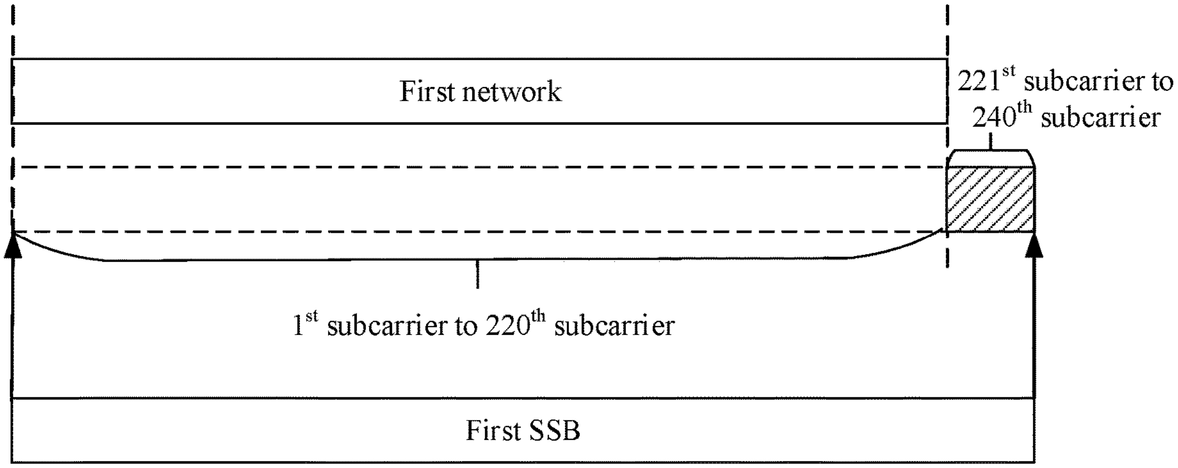
FIG. 21 is a schematic diagram of another mapping of PBCH according to an embodiment of this application.

In a mapping manner 4, the PBCH is mapped based on bandwidth of an SSB, and sequences mapped to frequency domain units before a $Y^{th}$ frequency domain unit are sent in ascending order in frequency domain. Y is a positive integer. For example, it is assumed that the first SSB occupies 240 subcarriers in frequency domain, and a first network includes 220 subcarriers. The mapping manner is mapping the first SSB based on the 240 subcarriers. A sequence mapped to a $221^{st}$ subcarrier to a $240^{th}$ subcarrier is not sent (or which is referred to as puncturing the $221^{st}$ subcarrier to the $240^{th}$ subcarrier). In this example, Y=20, as shown in FIG. 21.

Figure 22:
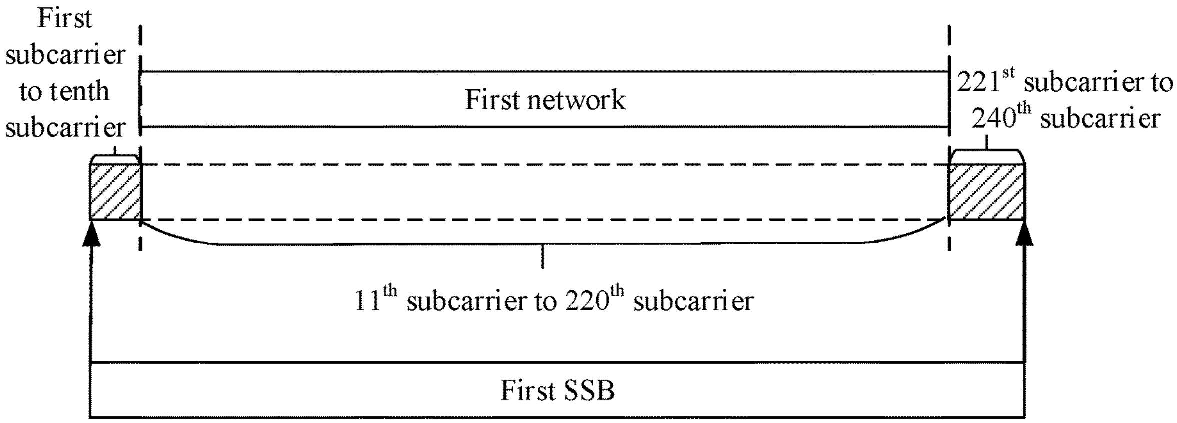
FIG. 22 is a schematic diagram of another mapping of PBCH according to an embodiment of this application.
Figure 23:
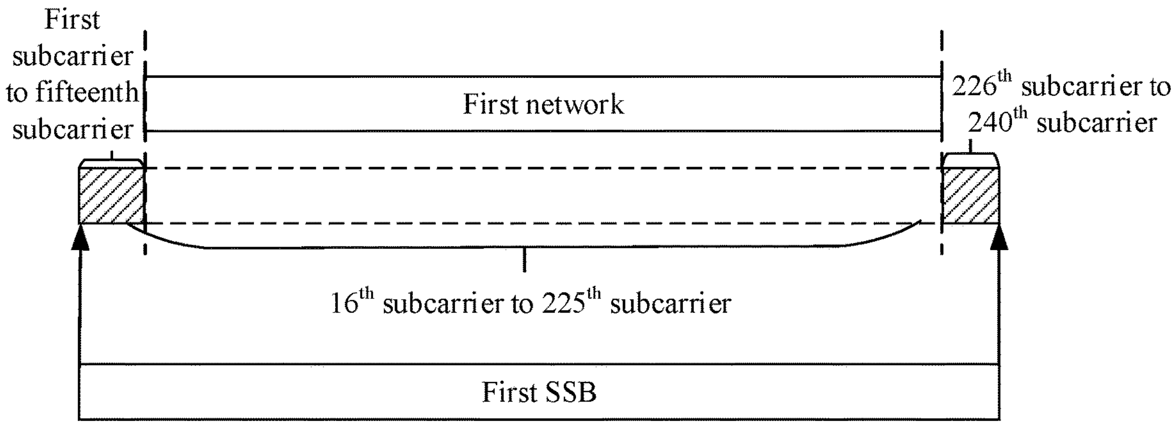
FIG. 23 is a schematic diagram of another mapping of PBCH according to an embodiment of this application.

In a mapping manner 5, the PBCH is mapped based on bandwidth of an SSB, and sequences mapped to frequency domain units after an $X1^{th}$ frequency domain unit and before a $Y1^{th}$ frequency domain unit are sent in ascending order in frequency domain. Both X1 and Y1 are positive integers. For example, it is assumed that the first SSB occupies 240 subcarriers in frequency domain, and a first network includes 210 subcarriers. The mapping manner is mapping the first SSB based on the 240 subcarriers. A sequence mapped to a first subcarrier to a tenth subcarrier and a $221^{st}$ subcarrier to a $240^{th}$ subcarrier is not sent (or which is referred to as puncturing the first subcarrier to the tenth subcarrier and the $221^{st}$ subcarrier to the $240^{th}$ subcarrier). In this example, X1=10, and Y1=20, as shown in FIG. 22. For another example, it is assumed that the first SSB occupies 240 subcarriers in frequency domain, and a first network includes 210 subcarriers. The mapping manner is mapping the first SSB based on the 240 subcarriers. A sequence mapped to a first subcarrier to a fifteenth subcarrier and a $226^{th}$ subcarrier to a $240^{th}$ subcarrier is not sent (or which is referred to as puncturing the first subcarrier to the fifteenth subcarrier and the $226^{st}$ subcarrier to the $240^{th}$ subcarrier). In this example, X1=15, and Y1=15, as shown in FIG. 23.

It should be understood that the foregoing mapping manners are only some examples for description. The Q preset manners may further include another mapping manner, which is not enumerated herein.

In this embodiment of this application, the mapping manner may also be referred to as a mapping pattern (pattern), a mapping format, or the like.

S1702: The network device maps the first SSB on a resource of the first network based on the first mapping manner.

S1703: A terminal device determines the first mapping manner of the PBCH in the first SSB.

It should be noted that there is no strict sequence for performing S1702 and S1703.

In an implementation, the network device may send first information to the terminal device. The first information indicates the first mapping manner. Specifically, the network device may send the first information to the terminal device when a preset condition is met. For example, when a mapping manner of the PBCH in the first SSB is a mapping manner A, the network device may send the first information to the terminal device. In this example, if the terminal device does not receive the first information, the mapping manner of the PBCH in the first SSB may be a mapping manner B by default.

The first information may be carried in a synchronization signal, or may be carried in another signal (for example, a first signal).

In an implementation in which the first information is carried in the synchronization signal, the first information may be indicated by using a synchronization sequence corresponding to the synchronization signal. The synchronization sequence further indicates a cell identity corresponding to the first information. The synchronization sequence includes a primary synchronization sequence and a secondary synchronization sequence. In an implementation, the cell identity and the mapping manner may be indicated by using the synchronization sequence.

For example, a correspondence between the synchronization sequence and indication content is as follows:

- a synchronization sequence 1 (namely, a PSS sequence 1, an SSS sequence 1) a cell identity 1 and a mapping manner 1;
- a synchronization sequence 2 (namely, a PSS sequence 2, the SSS sequence 1) the cell identity 1 and a mapping manner 2;
- a synchronization sequence 3 (namely, the PSS sequence 1, an SSS sequence 2) a cell identity 2 and the mapping manner 1;
- a synchronization sequence 4 (namely, the PSS sequence 2, the SSS sequence 2) the cell identity 2 and the mapping manner 2; and
- the rest can be deduced by analogy.

In an implementation in which the first information is carried in the first signal, the first signal may be a bit set. The bit set includes at least one bit. In an implementation, before the first signal is sent, channel coding may be performed, or a CRC may be added.

In this implementation, the first signal may indicate different mapping manners by using different bit sets.

Alternatively, the first signal may be a sequence.

For example, the sequence of the first signal may be a sequence designed for the first signal. In an implementation, channel coding may not be performed on the first signal, or the cyclic redundancy code (cyclic redundancy code, CRC) may not be added to the first signal.

In this implementation, the first signal may indicate different mapping manners by using different sequences.

For another example, the sequence of the first signal may alternatively be generated in a manner of generating a synchronization sequence (which may be a primary synchronization sequence, or may be a secondary synchronization sequence). A cyclic shift value for generating a first sequence is different from a cyclic shift value for generating the synchronization sequence.

For example, in an NR system, the primary synchronization sequence $d_{PSS}(n)$ may meet the following formula, or may be determined according to the following formula:

$$d_{PSS}(n) = 1 - 2x(m), \text{ where}$$

$$m = \left(n + 43N_{ID}^{(2)}\right) \bmod 127,$$

$$0 \le n < 127,$$

$$x(i+7) = (x(i+4) + x(i)) \bmod 2, \text{ and}$$

$$[x(6)\ x(5)\ x(4)\ x(3)\ x(2)\ x(1)\ x(0)] = [1\ 1\ 1\ 0\ 1\ 1\ 0].$$

In the foregoing formula, a cyclic shift value of the primary synchronization sequence in NR is $$43N_{ID}^{(2)}.$$

Correspondingly, the first signal may meet the following formula, or may be determined according to the following formula:

$$d(n) = 1 - 2x(m), \text{ where}$$

$$m = (n + A) \bmod 127,$$

$$0 \le n < 127,$$

$$x(i+7) = (x(i+4) + x(i)) \bmod 2, \text{ and}$$

$$[x(6)\ x(5)\ x(4)\ x(3)\ x(2)\ x(1)\ x(0)] = [1\ 1\ 1\ 0\ 1\ 1\ 0].$$

The first signal may use a cyclic shift value different from that of the primary synchronization sequence in NR. To be specific, a cyclic shift value A is another value other than $$43N_{ID}^{(2)}.$$

In this implementation, the first signal may indicate different mapping manners by using different cyclic shift values.

In the NR system, the secondary synchronization sequence $d_{SSS}(n)$ may meet the following formula, or may be determined according to the following formula:

$$d_{SSS}(n) = [1 - 2x_0((n + m_0) \bmod 127)][1 - 2x_1((n + m_1) \bmod 127)],$$

where $$m_0 = 15\left\lfloor \frac{N_{ID}^{(1)}}{112} \right\rfloor + 5N_{ID}^{(2)},$$

$$m_1 = N_{ID}^{(1)} \bmod 112,$$

$$0 \le n < 127,$$

$$x_0(i+7) = (x_0(i+4) + x_0(i)) \bmod 2,$$

$$x_1(i+7) = (x_1(i+4) + x_1(i)) \bmod 2,$$

$$[x_0(6)\,x_0(5)\,x_0(4)\,x_0(3)\,x_0(2)\,x_0(1)\,x_0(0)] = [0\ 0\ 0\ 0\ 0\ 0\ 1],$$

and $$[x_1(6)\,x_1(5)\,x_1(4)\,x_1(3)\,x_1(2)\,x_1(1)\,x_1(0)] = [0\ 0\ 0\ 0\ 0\ 0\ 1].$$

In the NR system, a physical cell identifier $$N_{ID}^{cell} = 3N_{ID}^{(1)} + N_{ID}^{(2)}, \text{ where } N_{ID}^{(1)} \in \{0, 1, \ldots, 335\}, \text{ and } N_{ID}^{(2)} \in \{0, 1, 2\}.$$

In the foregoing formula, cyclic shift values of the secondary synchronization sequence in NR are $m_0$ and $m_1$.

Correspondingly, the first signal may meet the following formula, or may be determined according to the following formula:

$$d(n) = [1 - 2x_0((n + A_0) \bmod 127)][1 - 2x_1((n + A_1) \bmod 127)], \text{ where}$$

$$0 \le n < 127,$$

$$x_0(i+7) = (x_0(i+4) + x_0(i)) \bmod 2,$$

$$x_1(i+7) = (x_1(i+4) + x_1(i)) \bmod 2,$$

$$[x_0(6)\ x_0(5) x_0(4)\ x_0(3)\ x_0(2)\ x_0(1)\ x_0(0)] = [0\ 0\ 0\ 0\ 0\ 0\ 1], \text{ and}$$

$$[x_1(6)\ x_1(5)\ x_1(4)\ x_1(3)\ x_1(2)\ x_1(1)\ x_1(0)] = [0\ 0\ 0\ 0\ 0\ 0\ 1].$$

The first signal may use a cyclic shift value different from that of the secondary synchronization sequence in NR. To be specific, a cyclic shift value $A_0$ is another value other than $m_0$, and a cyclic shift value $A_1$ is another value other than $m_1$. In this implementation, the first signal may indicate different mapping manners by using different cyclic shift values.

For another example, a sequence designed for the synchronization signal (namely, the synchronization sequence) may also be reused for the sequence of the first signal. For example, a sequence may be selected from a first set as the first signal. The first set includes at least one primary synchronization sequence and/or at least one secondary synchronization sequence.

In this implementation, the first signal may indicate different mapping manners by using different synchronization sequences.

Figure 24:
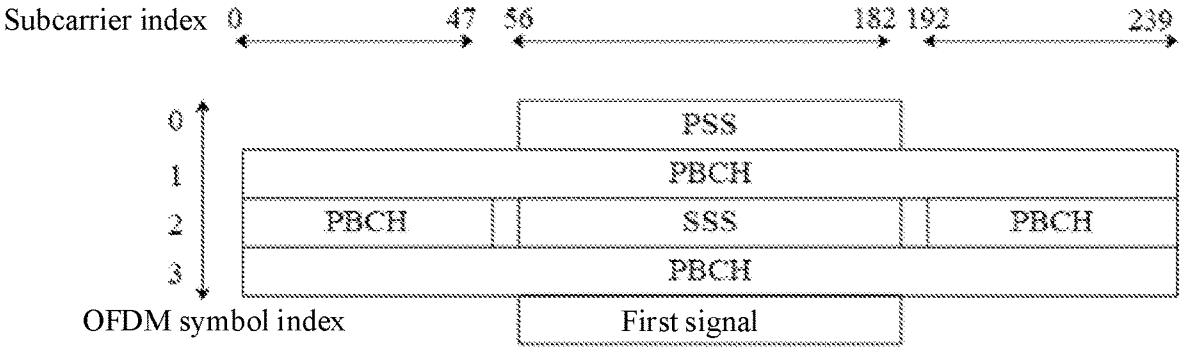
FIG. 24 is a schematic diagram of sending a first signal according to an embodiment of this application.

If the first information is indicated by using the first signal, the first signal and a synchronization signal in the first SSB may occupy a same resource in frequency domain, and are located in a same slot in time domain, as shown in FIG. 24.

A quasi-colocation (quasi-colocation, QCL) relationship between the first signal and the synchronization signal in the first SSB may be Type A, Type C, Type A+Type D, or Type C+Type D.

S1704: The network device sends the mapped first SSB. Correspondingly, the terminal device receives the first SSB based on the first mapping manner.

Optionally, the terminal device may obtain time and frequency synchronization based on the first SSB. In addition, the terminal device may further obtain a system message based on the first SSB. For example, the system message may be an MIB. Specifically, the terminal device may obtain time and frequency synchronization based on the synchronization signal (namely, a PSS and an SSS) in the first SSB, and obtain the system message based on the PBCH in the first SSB.

According to the communication method in FIG. 17, a mapping pattern of the PBCH is indicated by using an existing synchronization signal or by introducing a new signal (for example, the first signal). This can improve deployment flexibility, prevent the terminal device from performing blind detection, and reduce complexity of receiving the PBCH by the terminal device. According to the foregoing method, when the terminal device does not obtain network information (such as bandwidth, a frequency range, a lowest frequency, and/or a highest frequency) of the first network, the terminal device may not need to blindly detect the first network. This can reduce power consumption of the terminal device, and improve energy saving effect.

Optionally, in the method according to any one of FIG. 6, FIG. 7, and FIG. 8 to FIG. 17, when the network device sends the PBCH, power of the PBCH meets at least one of the following.

(1) PBCH data (data) energy per resource element (energy per resource element, EPRE) may be greater than SSS EPRE. In other words, a ratio of the PBCH data EPRE to the SSS EPRE is greater than 0 dB.

The ratio of the PBCH data EPRE to the SSS EPRE may be related to the mapping pattern of the PBCH. The mapping pattern of the PBCH includes PBCH data and a mapping pattern of a PBCH DM-RS. For example, the ratio of the PBCH data EPRE to the SSS EPRE may be related to a quantity of frequency units to which the PBCH is mapped. For example, when the quantity of frequency units to which the PBCH is mapped is less than a first threshold, the PBCH data EPRE is greater than the SSS EPRE. The frequency unit is an RB or a subcarrier. When the quantity of frequency units to which the PBCH is mapped is equal to a first threshold, the PBCH data EPRE is the same as the SSS EPRE. The first threshold may be an integer greater than 0. For example, the frequency unit is the RB, and the first threshold may be 20. Alternatively, the frequency unit is the subcarrier, and the first threshold may be 240.

(2) PBCH demodulation reference signal (demodulation reference signal, DM-RS) EPRE may be greater than SSS EPRE. In other words, a ratio of the PBCH DM-RS EPRE to the SSS EPRE is greater than 0 dB.

The ratio of the PBCH DM-RS EPRE to the SSS EPRE may be related to the mapping pattern of the PBCH. For example, the ratio of the PBCH data EPRE to the SSS EPRE may be related to a quantity of frequency units to which the PBCH is mapped. For example, when the quantity of frequency units to which the PBCH is mapped is less than a first threshold, the PBCH DM-RS EPRE is greater than the SSS EPRE. When the quantity of frequency units to which the PBCH is mapped is equal to a first threshold, the PBCH DM-RS EPRE is the same as the SSS EPRE.

In the foregoing manner, performance of the PBCH can be further improved by increasing sending power of the PBCH.

Figure 25:
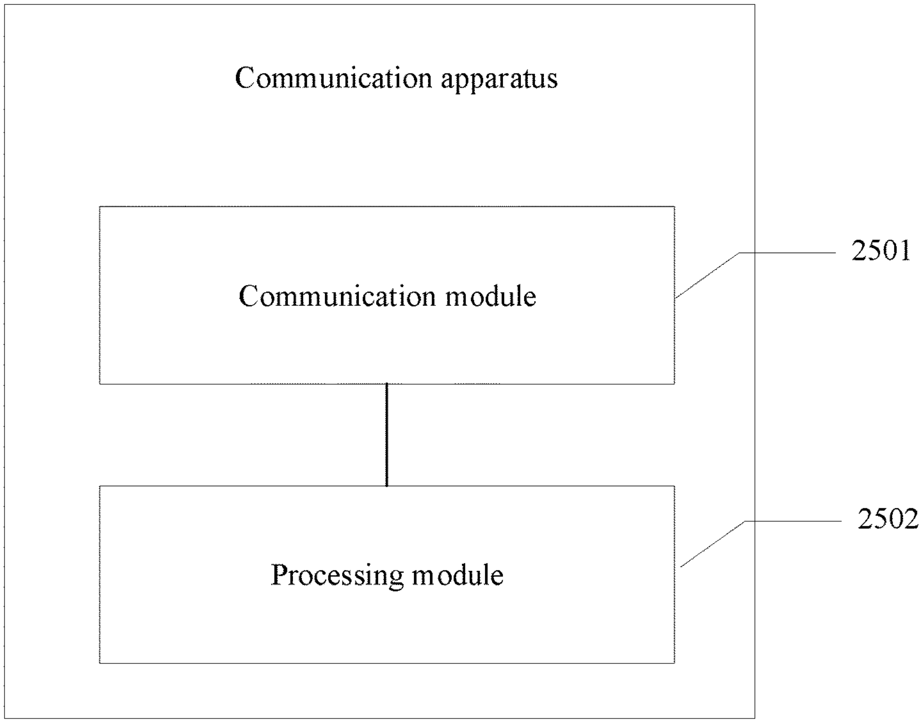
FIG. 25 is a schematic diagram of a structure of a communication apparatus according to an embodiment of this application.

Based on a same inventive concept as the method embodiments, an embodiment of this application provides a communication apparatus. A structure of the communication apparatus may be shown in FIG. 25. The communication apparatus includes a communication module 2501 and a processing module 2502.

In an implementation, the communication apparatus may be configured to implement the method performed by the network device in the embodiment in FIG. 6. The apparatus may be a network device, or may be a chip or a chipset in the network device, or a part of a chip that is configured to perform a related method function. The processing module 2502 is configured to: generate a sequence corresponding to a first SSB; and determine a first SSB frequency location. The first SSB frequency location is associated with bandwidth of a first network, or the first SSB frequency location is related to a lowest frequency of the first network and/or a highest frequency of the first network. The communication module 2501 is configured to send, based on the first SSB frequency location, the sequence corresponding to the first SSB.

The processing module 2502 may be further configured to determine the bandwidth of the first network based on a frequency band number of the first network, where an association relationship exists between the bandwidth of the first network and the frequency band number of the first network.

The processing module 2502 may be further configured to: determine the bandwidth of the first network based on a frequency band number of the first network, where an association relationship exists between the bandwidth of the first network and the frequency band number of the first network; and determine the lowest frequency and/or the highest frequency based on the frequency band number and the bandwidth.

In an implementation, the communication apparatus may be configured to implement the method performed by the terminal device in the embodiment in FIG. 6. The apparatus may be a terminal device, or may be a chip or a chipset in the terminal device, or a part of a chip that is configured to perform a related method function. The communication module 2501 is configured to communicate with a network device. The processing module 2502 is configured to: detect a sequence of a first SSB at a first SSB frequency location by using the communication module 2501, where the first SSB frequency location is associated with bandwidth of a first network, or the first SSB frequency location is related to a lowest frequency of the first network and/or a highest frequency of the first network; and obtain time and frequency synchronization based on the sequence of the first SSB.

The processing module 2502 may be further configured to determine the bandwidth of the first network based on a frequency band number of the first network, where an association relationship exists between the bandwidth of the first network and the frequency band number of the first network.

The processing module 2502 may be further configured to: determine the bandwidth of the first network based on a frequency band number of the first network, where an association relationship exists between the bandwidth of the first network and the frequency band number of the first network; and determine the lowest frequency and/or the highest frequency based on the frequency band number and the bandwidth.

In an implementation, the communication apparatus may be configured to implement the method performed by the network device in the embodiment in FIG. 12. The apparatus may be a network device, or may be a chip or a chipset in the network device, or a part of a chip that is configured to perform a related method function. The processing module 2502 is configured to: generate a sequence corresponding to a first SSB; determine, based on a first SSB frequency location and a frequency range of a first network, a mapping manner of the sequence corresponding to the first SSB; and map, based on the mapping manner, the sequence corresponding to the first SSB. The communication module 2501 is configured to send the mapped sequence corresponding to the first SSB.

The processing module 2502 may be further configured to: determine bandwidth of the first network based on a frequency band number of the first network, where an association relationship exists between the bandwidth of the first network and the frequency band number of the first network; and determine a lowest frequency and/or a highest frequency based on the frequency band number and the bandwidth.

In an implementation, the communication apparatus may be configured to implement the method performed by the terminal device in the embodiment in FIG. 12. The apparatus may be a terminal device, or may be a chip or a chipset in the terminal device, or a part of a chip that is configured to perform a related method function. The processing module 2502 is configured to: determine, based on a first synchronization signal/physical broadcast channel block SSB frequency location and a frequency range of a first network, a mapping manner of a sequence corresponding to a first SSB; and perform demapping on the first SSB based on the mapping manner.

The processing module 2502 may be further configured to: determine bandwidth of the first network based on a frequency band number of the first network, where an association relationship exists between the bandwidth of the first network and the frequency band number of the first network; and determine a lowest frequency and/or a highest frequency based on the frequency band number and the bandwidth.

In an implementation, the communication apparatus may be configured to implement the method performed by the network device in the embodiment in FIG. 15. The apparatus may be a network device, or may be a chip or a chipset in the network device, or a part of a chip that is configured to perform a related method function. The processing module 2502 is configured to: generate a sequence corresponding to a first SSB; and determine a first SSB frequency location, where the first SSB frequency location $SS_{REF}$ meets:

$$SS_{REF} = N \times f_1 + M \times f_2$$

$f_1$ and $f_2$ are constants greater than 0, N is a coefficient of $f_1$, N is a positive integer, and a candidate value of M includes at least one integer greater than 5. The communication module 2501 is configured to send, based on the first SSB frequency location, the sequence corresponding to the first SSB.

In an implementation, the communication apparatus may be configured to implement the method performed by the terminal device in the embodiment in FIG. 15. The apparatus may be a terminal device, or may be a chip or a chipset in the terminal device, or a part of a chip that is configured to perform a related method function. The communication module 2501 is configured to communicate with a network device. The processing module 2502 is configured to: detect a sequence of a first SSB at a first SSB frequency location by using the communication module 2501, where the first SSB frequency location $SS_{REF}$ meets:

$$SS_{REF}=N\times f_1+M\times f_2$$

$f_1$ and $f_2$ are constants greater than 0, N is a coefficient of $f_1$, N is a positive integer, and a candidate value of M includes at least one integer greater than 5; and obtain time and frequency synchronization based on the sequence of the first SSB.

In an implementation, the communication apparatus may be configured to implement the method performed by the network device in the embodiment in FIG. 17. The apparatus may be a network device, or may be a chip or a chipset in the network device, or a part of a chip that is configured to perform a related method function. The processing module 2502 is configured to:

determine a first mapping manner of a physical broadcast channel PBCH block in a first SSB, where the first mapping manner is one of Q preset mapping manners, and Q is an integer greater than 1; and map the PBCH to a resource of a first network based on the first mapping manner. The communication module 2501 is configured to send the mapped PBCH.

Optionally, the communication module 2501 may be further configured to send first information to a terminal device. The first information indicates the first mapping manner.

Specifically, the communication module 2501 may send the first information to the terminal device when the first mapping manner meets a preset condition.

In an implementation, the communication apparatus may be configured to implement the method performed by the terminal device in the embodiment in FIG. 17. The apparatus may be a terminal device, or may be a chip or a chipset in the terminal device, or a part of a chip that is configured to perform a related method function. The processing module 2502 is configured to determine a first mapping manner of a physical broadcast channel PBCH block in a first SSB, where the first mapping manner is one of Q preset mapping manners, and Q is an integer greater than 1. The communication module 2501 is configured to receive the PBCH based on the first mapping manner.

Optionally, when determining the first mapping manner of the PBCH in the first SSB, the processing module 2502 is configured to receive first information by using the communication module 2501. The first information indicates the first mapping manner.

In this embodiment of this application, the module division is an example, and is only logical function division and may be another division manner in actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module. It may be understood that for functions or implementations of the modules in embodiments of this application, further refer to related description in the method embodiments.

Figure 26:
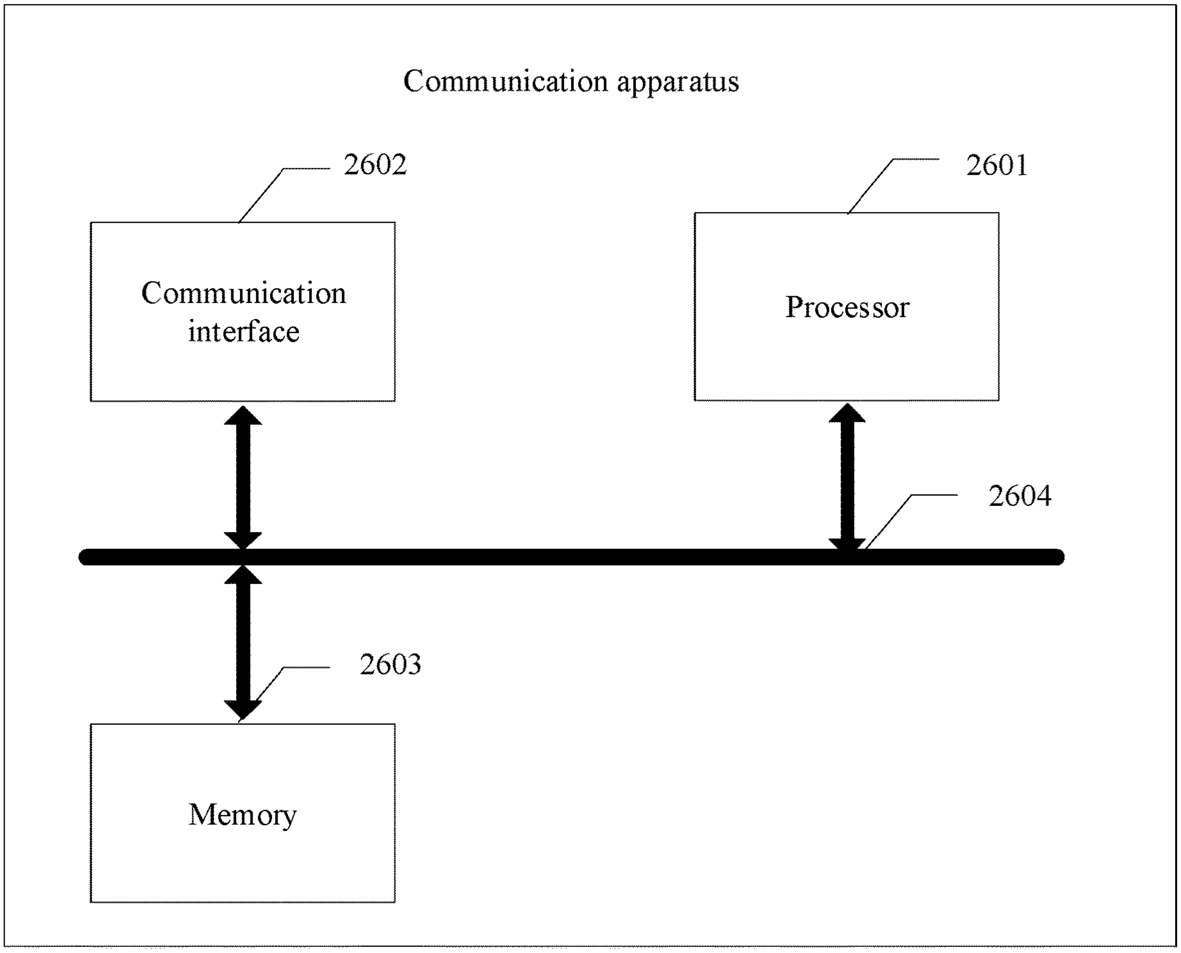
FIG. 26 is a schematic diagram of a structure of a communication apparatus according to an embodiment of this application.

In a possible implementation, the communication apparatus may be shown in FIG. 26. The apparatus may be a communication device or a chip in a communication device. The communication device may be the terminal device in the foregoing embodiments, or may be the network device in the foregoing embodiments. The apparatus includes a processor 2601 and a communication interface 2602, and may further include a memory 2603. The processing module 2502 may be the processor 2601. The communication module 2501 may be the communication interface 2602.

The processor 2601 may be a CPU, a digital processing unit, or the like. The communication interface 2602 may be a transceiver, an interface circuit such as a transceiver circuit, a transceiver chip, or the like. The apparatus further includes a memory 2603, configured to store a program executed by the processor 2601. The memory 2603 may be a nonvolatile memory such as a hard disk drive (hard disk drive, HDD) or a solid-state drive (solid-state drive, SSD), or may be a volatile memory (volatile memory) such as a random-access memory (random-access memory, RAM). The memory 2603 is any other medium that can carry or store expected program code in a form of an instruction structure or a data structure and that can be accessed by a computer, but is not limited thereto.

The processor 2601 is configured to execute the program code stored in the memory 2603, and is configured to perform an action of the processing module 2502. Details are not described herein again in this application. The communication interface 2602 is configured to perform an action of the communication module 2501. Details are not described herein again in this application.

A specific connection medium between the communication interface 2602, the processor 2601, and the memory 2603 is not limited in this embodiment of this application. In this embodiment of this application, the memory 2603, the processor 2601, and the communication interface 2602 are connected to each other through a bus 2604 in FIG. 26. The bus is represented by using a bold line in FIG. 26. A connection manner between other components is only an example for description, and is not limited thereto. The bus may be categorized as an address bus, a data bus, a control bus, or the like. For ease of expression, only one bold line is used to represent the bus in FIG. 26, but this does not mean that there is only one bus or one type of bus.

An embodiment of the present disclosure further provides a computer-readable storage medium, configured to store computer software instructions that need to be executed for execution of the foregoing processor, and the computer-readable storage medium includes a program that needs to be executed for execution of the foregoing processor.

An embodiment of this application further provides a communication system, including a communication apparatus configured to implement functions of the terminal device in the embodiment in FIG. 6 and a communication apparatus configured to implement functions of the network device in the embodiment in FIG. 6.

An embodiment of this application further provides a communication system, including a communication apparatus configured to implement functions of the terminal device in the embodiment in FIG. 12 and a communication apparatus configured to implement functions of the network device in the embodiment in FIG. 12.

An embodiment of this application further provides a communication system, including a communication apparatus configured to implement functions of the terminal device in the embodiment in FIG. 15 and a communication apparatus configured to implement functions of the network device in the embodiment in FIG. 15.

An embodiment of this application further provides a communication system, including a communication apparatus configured to implement functions of the terminal device in the embodiment in FIG. 17 and a communication apparatus configured to implement functions of the network device in the embodiment in FIG. 17.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product implemented on one or more computer-usable storage media (including but not limited to a disk memory, a CD-ROM, an optical memory, and the like) that include computer-usable program code.

This application is described with reference to the flowcharts and/or block diagrams of the methods, the devices (systems), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of protection defined by the claims of this application and their equivalent technologies.

What is claimed is:

1. A communication method, applicable to a network device for performing communications in a network, the method comprising:

generating a sequence corresponding to a first synchronization signal/physical broadcast channel block (SS/PBCH block, SSB);

determining a first SSB frequency location, wherein the first SSB frequency location is associated with bandwidth of the network, or the first SSB frequency location is related to at least one of a lowest frequency of the network or a highest frequency of the network; and sending, based on the first SSB frequency location, the sequence corresponding to the first SSB; wherein the first SSB frequency location $SS_{REF}$ meets:

$SS_{REF}=N\times f_1+M\times f_2$, wherein $f_1$ and $f_2$ are constants greater than 0, N is a coefficient of $f_1$, N is a positive integer, and a value of M is associated with the bandwidth of the network;

$$SS_{REF}=(F_{DL\_low}+F_{DL\_high})/2;$$

$SS_{REF}=F_{DL\_low}+\Delta 1$, wherein $\Delta 1$ is an offset value; or $SS_{REF}=F_{DL\_high}-\Delta 2$, wherein $\Delta 2$ is an offset value;

wherein $F_{DL\_low}$ is the lowest frequency, and $F_{DL\_high}$ is the highest frequency.

2. The method according to claim 1, wherein at least one of $\Delta 1$ or $\Delta 2$ is ½ of bandwidth corresponding to an SSB.

3. The method of claim 1, the method further comprising:

determining the bandwidth of the network based on a frequency band number of the network and an association relationship between the bandwidth of the network and the frequency band number of the network.

4. The method of claim 1, the method further comprising:

determining the bandwidth of the network based on a frequency band number of the network and an association relationship between the bandwidth of the network and the frequency band number of the network; and determining at least one of the lowest frequency or the highest frequency based on the frequency band number and the bandwidth.

5. A communication method, applicable to a terminal device for performing communications in a network, the method comprising:

detecting a sequence of a first synchronization signal/physical broadcast channel block SS/PBCH block, SSB) at a first SSB frequency location, wherein the first SSB frequency location is associated with bandwidth of the network, or the first SSB frequency location is related to at least one of a lowest frequency of the network or a highest frequency of the network; and obtaining time and frequency synchronization based on the sequence of the first SSB; wherein the first SSB frequency location $SS_{REF}$ meets:

$SS_{REF}=N\times f_1+M\times f_2$, wherein $f_1$ and $f_2$ are constants greater than 0, N is a coefficient of $f_1$, N is a positive integer, and a value of M is associated with the bandwidth of the network;

$$SS_{REF}=(F_{DL\_low}+F_{DL\_high})/2;$$

$SS_{REF}=F_{DL\_low}+\Delta 1$, wherein $\Delta 1$ is an offset value; or $SS_{REF}=F_{DL\_high}-\Delta 2$, wherein $\Delta 2$ is an offset value;

wherein $F_{DL\_low}$ is the lowest frequency, and $F_{DL\_high}$ is the highest frequency.

6. The method of claim 5, wherein at least one of $\Delta 1$ or $\Delta 2$ is ½ of bandwidth corresponding to an SSB.

7. The method of claim 5, the method further comprising:

determining the bandwidth of the network based on a frequency band number of the network and an association relationship between the bandwidth of the network and the frequency band number of the network.

8. The method of claim 5, the method further comprising:

determining the bandwidth of the network based on a frequency band number of the network and an association relationship between the bandwidth of the network and the frequency band number of the network; and determining at least one of the lowest frequency or the highest frequency based on the frequency band number and the bandwidth.

9. The method of claim 5, wherein each of P SSB frequency locations for detecting the first SSB meets that a synchronization signal in the first SSB is mapped into a frequency range of the network based on the SSB frequency location, wherein P is a positive integer, and the P SSB frequency locations comprise the first SSB frequency location.

10. A communication apparatus for performing communications in a network, the communication apparatus comprising:

at least one processor configured to:

generate a sequence corresponding to a first synchronization signal/physical broadcast channel block (SS/PBCH block, SSB); and determine a first SSB frequency location, wherein the first SSB frequency location is associated with bandwidth of the network, or the first SSB frequency location is related to at least one of a lowest frequency of the network or a highest frequency of the network; and send, based on the first SSB frequency location, the sequence corresponding to the first SSB;

wherein the first SSB frequency location $SS_{REF}$ meets:

$SS_{REF}=N\times f_1+M\times f_2$, wherein $f_1$ and $f_2$ are constants greater than 0, N is a coefficient of $f_1$, N is a positive integer, and a value of M is associated with the bandwidth of the network;

$$SS_{REF}=(F_{DL\_low}+F_{DL\_high})/2;$$

$SS_{REF}=F_{DL\_low}+\Delta 1$, wherein $\Delta 1$ is an offset value; or $SS_{REF}=F_{DL\_high}-\Delta 2$, wherein $\Delta 2$ is an offset value;

wherein $F_{DL\_low}$ is the lowest frequency, and $F_{DL\_high}$ is the highest frequency.

11. The apparatus of claim 10, wherein at least one of $\Delta 1$ or $\Delta 2$ is ½ of bandwidth corresponding to an SSB.

12. The apparatus of claim 10, wherein the at least one processor is further configured to:

determine the bandwidth of the network based on a frequency band number of the network and an association relationship between the bandwidth of the network and the frequency band number of the network.

13. The apparatus of claim 10, wherein the at least one processor is further configured to:

determine the bandwidth of the network based on a frequency band number of the network and an association relationship between the bandwidth of the network and the frequency band number of the network; and determine the at least one of the lowest frequency or the highest frequency based on the frequency band number and the bandwidth.

14. A communication apparatus for performing communications in a network, the communication apparatus comprising:

at least one processor configured to:

detect a sequence of a first synchronization signal/physical broadcast channel block SS/PBCH block, SSB) at a first SSB frequency location, wherein the first SSB frequency location is associated with bandwidth of the network, or the first SSB frequency location is related to at least one of a lowest frequency of the network or a highest frequency of the network; and obtain time and frequency synchronization based on the sequence of the first SSB; wherein the first SSB frequency location $SS_{REF}$ meets:

$SS_{REF}=N\times f_1+M\times f_2$, wherein f, and f, are constants greater than 0, N is a coefficient of $f_1$, N is a positive integer, and a value of M is associated with the bandwidth of the network;

$$SS_{REF}=(F_{DL\_low}+F_{DL\_high})/2;$$

$SS_{REF}=F_{DL\_low}+\Delta 1$, wherein $\Delta 1$ is an offset value; or $SS_{REF}=F_{DL\_high}-\Delta 2$, wherein $\Delta 2$ is an offset value;

wherein $F_{DL\_low}$ is the lowest frequency, and $F_{DL\_high}$ is the highest frequency.

15. The apparatus of claim 14, wherein the at least one processor is further configured to:

determine the bandwidth of the network based on a frequency band number of the network and an association relationship between the bandwidth of the network and the frequency band number of the network; and determine the at least one of the lowest frequency or the highest frequency based on the frequency band number and the bandwidth.

* * * * *